(12) United States Patent
Kim et al.

(10) Patent No.: US 9,179,383 B2
(45) Date of Patent: Nov. 3, 2015

(54) METHOD AND TERMINAL FOR DETERMINING HANDOVER FOR TRAFFIC OFFLOADED ONTO WLAN

(71) Applicant: LG ELECTRONICS INC., Seoul (KR)

(72) Inventors: Hyun Sook Kim, Seoul (KR); Jae Hyun Kim, Seoul (KR); Lae Young Kim, Seoul (KR); Tae Hyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 14/158,142

(22) Filed: Jan. 17, 2014

(65) Prior Publication Data

US 2014/0206353 A1    Jul. 24, 2014

Related U.S. Application Data

(60) Provisional application No. 61/754,621, filed on Jan. 20, 2013, provisional application No. 61/805,514, filed on Mar. 26, 2013, provisional application No. 61/805,939, filed on Mar. 28, 2013, provisional application No. 61/912,028, filed on Dec. 5, 2013.

(51) Int. Cl.
*H04W 36/14* (2009.01)
*H04W 36/24* (2009.01)
*H04W 36/00* (2009.01)

(52) U.S. Cl.
CPC ............. *H04W 36/14* (2013.01); *H04W 36/24* (2013.01); *H04W 36/0022* (2013.01)

(58) Field of Classification Search
CPC .. H04W 36/14; H04W 36/24; H04W 36/0022
USPC ........................................................ 455/436
See application file for complete search history.

(56) References Cited

U.S. PATENT DOCUMENTS

| | | |
|---|---|---|
| 2011/0170517 A1 | 7/2011 | Bakker et al. |
| 2012/0182912 A1 | 7/2012 | Watfa et al. |
| 2012/0189016 A1 | 7/2012 | Bakker et al. |
| 2012/0324100 A1* | 12/2012 | Tomici et al. ............... 709/224 |
| 2013/0021968 A1* | 1/2013 | Reznik et al. ............... 370/328 |
| 2013/0265985 A1* | 10/2013 | Salkintzis .................... 370/331 |

FOREIGN PATENT DOCUMENTS

WO    2012/066759 A1    5/2012

* cited by examiner

*Primary Examiner* — Marcos Torres
(74) *Attorney, Agent, or Firm* — Dentons US LLP

(57) ABSTRACT

There is provided a method for determining a handover. The method may comprise: determining, by User Equipment (UE), whether a timer is running, wherein the UE has accessed multiple Radio Access Technologies (RATs); if the timer is not running, performing, by the UE, a handover of a data traffic, which has been routed onto a Wireless LAN (WLAN), to an original RAT; and if the timer is running, not performing, by the UE, the handover of the data traffic, which has been routed onto the WLAN, to the original RAT. The data traffic may be been routed onto the WLAN as a result of Circuit Switched Fall-Back (CSFB) or 3GPP RAT mobility.

12 Claims, 24 Drawing Sheets

METHOD AND TERMINAL FOR DETERMINING HANDOVER FOR TRAFFIC OFFLOADED ONTO WLAN

CROSS-REFERENCE TO RELATED APPLICATIONS

This application claims the benefit of priority of U.S. Provisional application No. 61/754,621 filed on Jan. 20, 2013, U.S. Provisional application No. 61/805,514 filed on Mar. 26, 2013, U.S. Provisional application No. 61/805,939 filed on Mar. 28, 2013 and U.S. Provisional application No. 61/912,028 filed on Dec. 5, 2013, all of which are incorporated by reference in their entirety herein.

TECHNICAL FIELD

The present invention relates to a method and terminal for determining handover for traffic offloaded onto a Wireless Local Area Network (WLAN).

BACKGROUND ART

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |

TABLE 1-continued

| REFERENCE POINT | DESCRIPTION |
|---|---|
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARD). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TM through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

Recently, the congestion of a core network managed by a mobile communication service provider is increased due to an explosive increase of data. As a scheme for reducing the increased congestion, there is a movement for offloading the data of a user terminal onto a common data communication network without passing through the core network of a service provider.

In order to offload traffic onto a common data communication network, a service provider needs to provide a policy to UE, and thus the UE can offload its own data onto a Wireless LAN (WLAN) in accordance with the policy.

In order to provide such a policy to UE, an Access Network Discovery and Selection Function (ANDSF) based on 3GPP has been improved to provide a policy related to a WLAN.

FIGS. 6A and 6B show network control entities for selecting an access network.

As can be seen with reference to FIG. 6A, the ANDSF may be present in the home network (Home Public Land Mobile Network (hereinafter called 'HPLMN')) of the UE 10. Furthermore, as can be seen with reference to FIG. 6B, the ANDSF may also be present in the Visited Public Land Mobile Network (hereinafter called 'VPLMN') of the UE 10. When the ANDSF is present in a home network as described above, it may be called an H-ANDSF 61. When the ANDSF is present in a visited network, it may be called a V-ANDSF 62. Hereinafter, the ANDSF 60 generally refers to the H-ANDSF 61 or the V-ANDSF 62.

The ANDSF can provide information about an inter-system movement policy, information for access network search, and information about inter-system routing, for example, a routing rule.

As a movement for offloading the data of a different user terminal onto a common data communication network without passing through the core network of a service provider is attempted, technologies, such as IP Flow Mobility and Seamless Offload (IFOM) and Multi-Access PDN Connectivity (MAPCON) for supporting multi-radio access, have been proposed. The MAPCON technology is for sending data using 3GPP access and Wi-Fi access as respective PDN connections, and the IFOM technology is for sending data by binding 3GPP access and Wi-Fi access to one PDN or P-GW.

FIG. 7A is an exemplary diagram of the IFOM technology, and FIG. 7B is an exemplary diagram of the MAPCON technology.

Referring to FIG. 7A, the IFOM technology is to provide the same PDN connection through several pieces of different access. Such IFOM technology provides seamless offloading onto a WLAN.

Furthermore, the IFOM technology provides the transfer of IP flows having the same one PDN connection from one access to the other access.

FIG. 7B is an exemplary diagram of the MAPCON technology.

As can be seen with reference to FIG. 7B, the MAPCON technology is to connect several PDN connections, easily, IP flows to other APNs through another access system.

In accordance with such MAPCON technology, the UE 10 can generate a new PDN connection on access that has not been used before. Alternatively, the UE 10 can generate a new PDN connection in one of several pieces of access that were used before. Alternatively, the UE 10 may transfer some of or all PDN connections to another access.

As described above, with the help of the technologies capable of offloading the traffic of UE onto a WLAN, the congestion of the core network of a mobile communication service provider can be reduced.

In some situations, however, a problem in that the traffic of UE may be ping-ponged without continuing to be stable may occur. For example, a ping-pong problem, such as that the traffic of UE is offloaded onto a WLAN, transferred to a 3GPP access network, and then offloaded onto a WLAN, may occur.

DISCLOSURE OF THE INVENTION

An object of one disclosure of this specification is to provide a scheme capable of solving the aforementioned problem.

In order to achieve the object, one disclosure of this specification provides a scheme for effectively performing Packet Switching (PS) handover between a 3GPP access network and a WLAN.

To be concrete, one disclosure of this specification provides a method for determining a handover. The method may comprise: determining, by User Equipment (UE), whether a timer is running, wherein the UE has accessed multiple Radio Access Technologies (RATs); if the timer is not running, performing, by the UE, a handover of a data traffic, which has been routed onto a Wireless LAN (WLAN), to an original RAT; and if the timer is running, not performing, by the UE, the handover of the data traffic, which has been routed onto the WLAN, to the original RAT. The data traffic may be been routed onto the WLAN as a result of Circuit Switched Fall-Back (CSFB) or 3GPP RAT mobility.

If a marking for the data traffic is released when the timer is expired, the handover may be performed. Alternatively, if the marking for the data traffic is not released during the timer is running, the handover may not be performed.

The marking may be performed in a bearer unit for the data traffic or in a PDN unit for the data traffic.

The data traffic may have been routed onto the WLAN in accordance with the result of the CSFB or the result of the 3GPP RAT mobility and an Inter-System Routing Policy (ISRP).

The ISRP may be received from a node that is responsible for an Access Network Discovery and Selection Function (ANDSF). In the ISRP, an Evolved Universal Terrestrial Radio Access Network (E-UTRAN) may be set to have higher priority than the WLAN and the WLAN may be set to have higher priority than a Universal Terrestrial Radio Access Network (UTRAN) or a GSM EDGE Radio Access Network (GERAN).

If the timer is not running, the handover may be performed in accordance with the priority between the E-UTRAN, the UTRAN, the GERAN and the WLAN, set in the ISRP. Alternatively, if the timer is running, the handover may not be performed by ignoring the priority between the E-UTRAN, the UTRAN, the GERAN and the WLAN, set in the ISRP.

The method may further comprise: performing a handover from the first RAT to a second RAT due to a geographical movement; offloading the data traffic onto the WLAN if the data traffic affected by the handover to the second RAT satisfies a condition of an Inter-System Routing Policy (ISRP); and running the timer.

The method may further comprise: performing the CSFB toward a second RAT if the UE placed in the first RAT attempts a voice call; offloading the data traffic onto the WLAN if the data traffic affected by the CSFB toward the second RAT satisfies a condition of an Inter-System Routing Policy (ISRP); and running the timer.

One disclosure of this specification also provides a User Equipment (UE) for determining handover. The UE may comprise: a transceiver unit configured to perform accesses to multiple Radio Access Technologies (RATs); and a control unit configured to determine whether a timer is running, perform a handover of a data traffic, which has been routed onto a Wireless LAN (WLAN), to a first RAT if the timer is not running, and not perform the handover of the data traffic, which has been routed onto the WLAN if the timer is not running. The data traffic may have been offloaded onto the WLAN as a result of Circuit Switched Fall-Back (CSFB) or a result of 3GPP RAT mobility.

In accordance with one disclosure of this specification, a problem in that data traffic offloaded onto a WLAN is ping-ponged to 3GPP RAT again can be solved.

MODES FOR CARRYING OUT THE PREFERRED EMBODIMENTS

Figure 1:
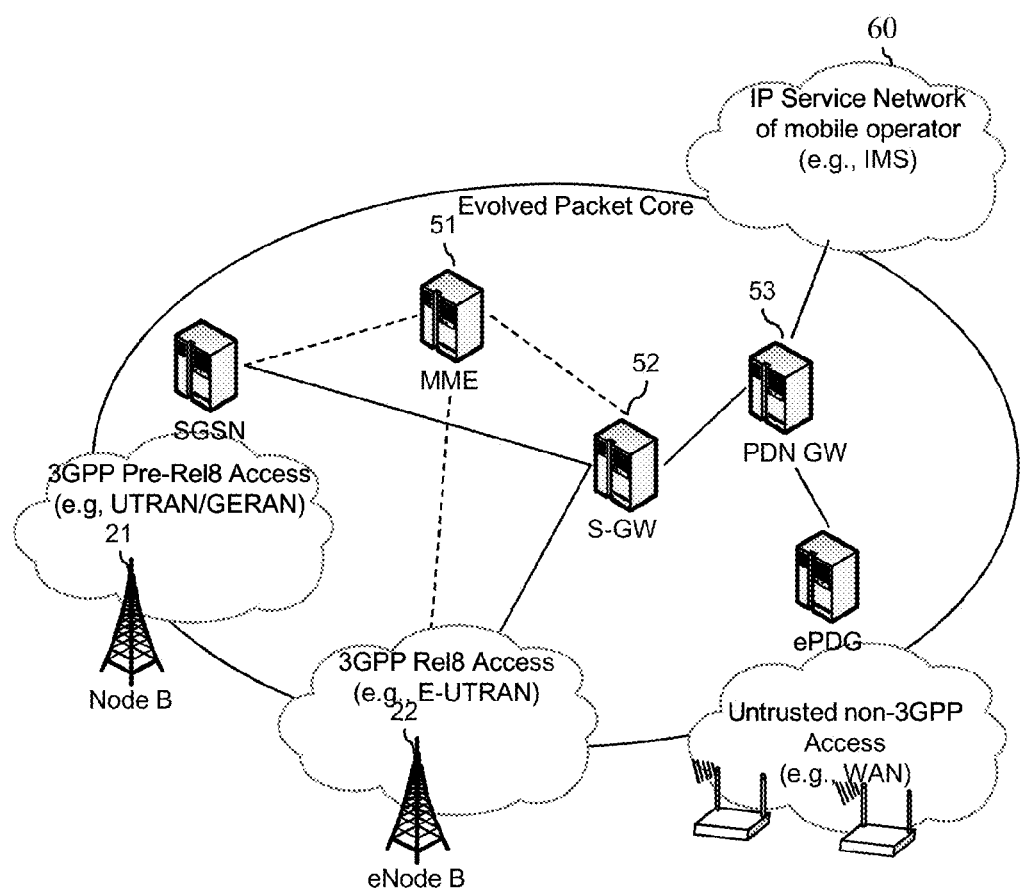
FIG. 1 shows the configuration of an evolved mobile communication network.
Figure 2:
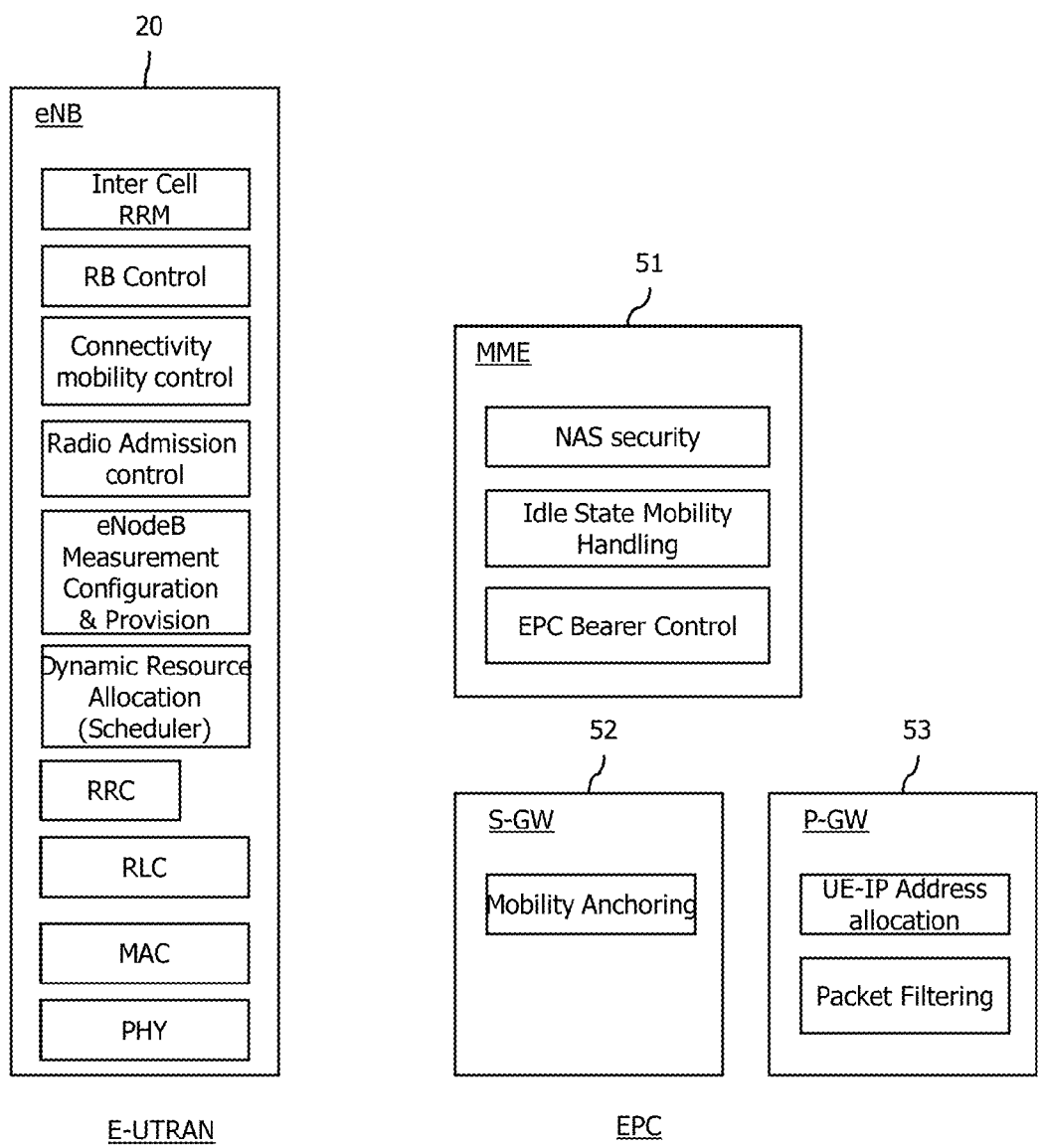
FIG. 2 is an exemplary diagram showing the architecture of a common E-UTRAN and a common EPC.
Figure 3:
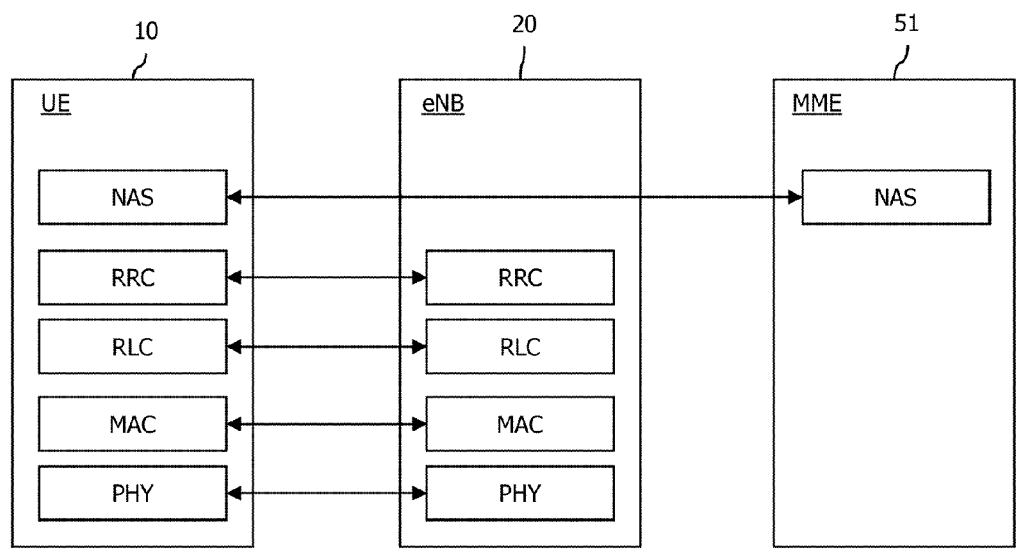
FIG. 3 is an exemplary diagram showing the structure of a radio interface protocol in a control plane between UE and an eNodeB.
Figure 4:
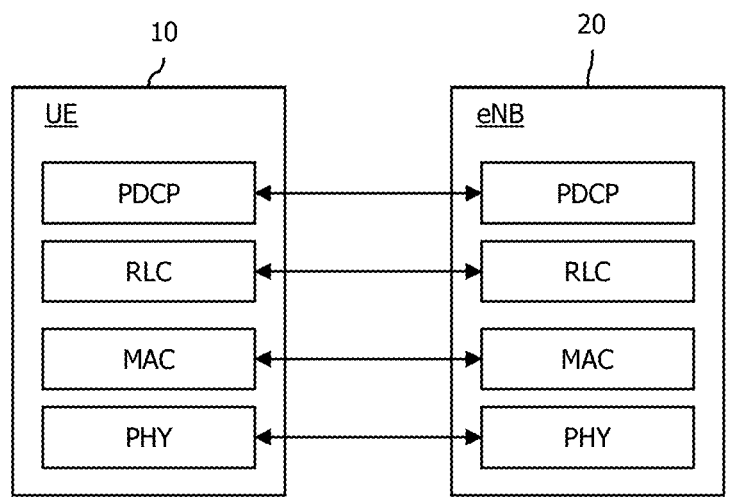
FIG. 4 is another exemplary diagram showing the structure of a radio interface protocol in a control plane between UE and an eNodeB.
Figure 5:
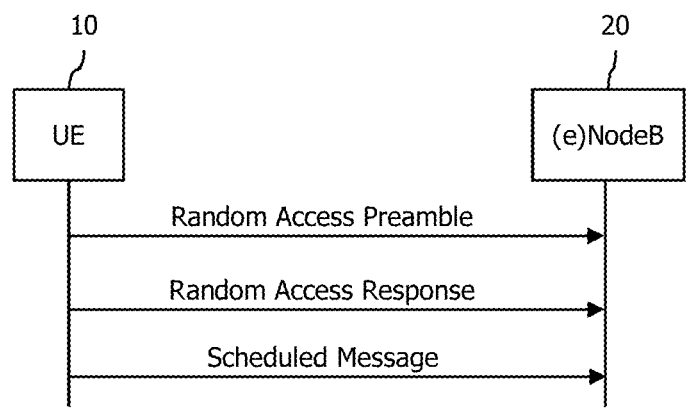
FIG. 5 is a flowchart illustrating a random access process in 3GPP LTE.
Figure 6A:
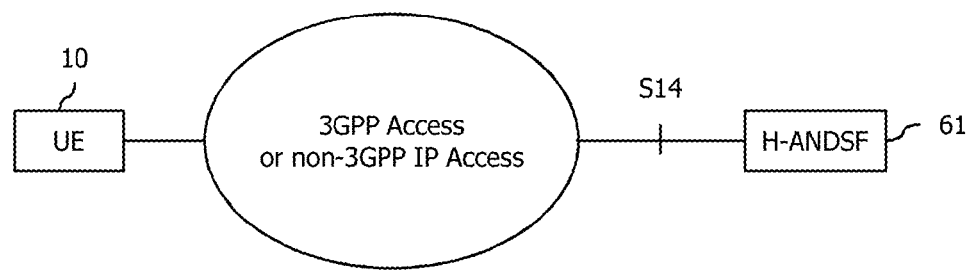
FIGS. 6A and 6B show network control entities for selecting an access network.
Figure 6B:
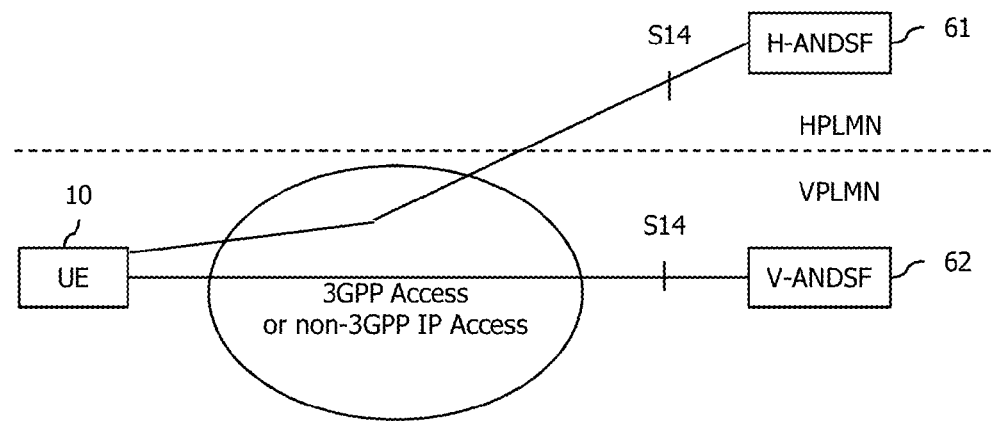
Figure 7A:
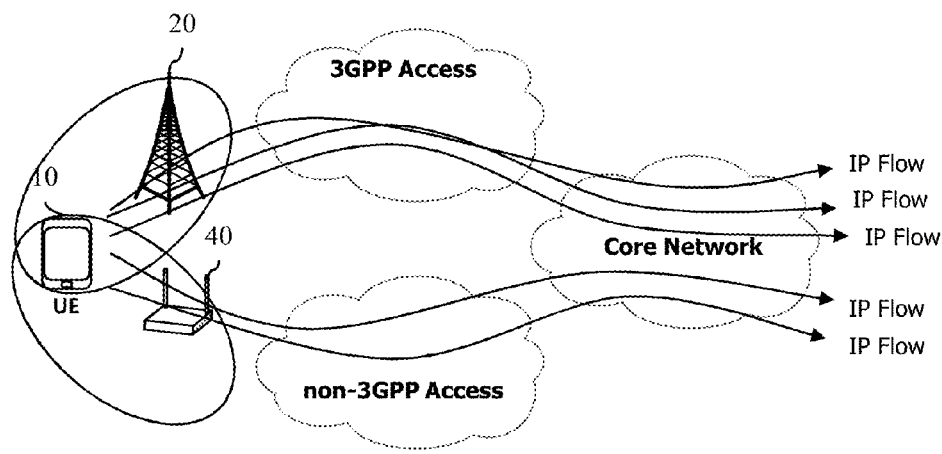
FIG. 7A is an exemplary diagram of IFOM technology.
Figure 7B:
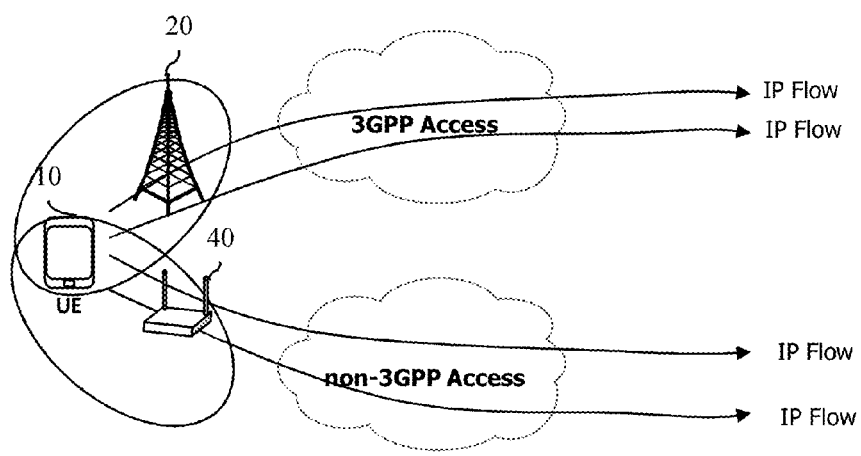
FIG. 7B is an exemplary diagram of MAP CON technology.

The present invention is described on the basis of a Universal Mobile Telecommunication System (UMTS) and an Evolved Packet Core (EPC). However, the present invention is not limited to such communication systems, but can be applied to all communication systems and methods to which the technical spirit of the present invention may be applied.

It is to be noted that technical terms used in this specification are used to describe only specific embodiments and are not intended to limit the present invention. Furthermore, the technical terms used in this specification should be construed as having meanings that are commonly understood by those skilled in the art to which the present invention pertains unless they are especially defined as different meanings in this specification and should not be construed as having excessively comprehensive meanings or excessively reduced meanings. Furthermore, if the technical terms used in this specification are erroneous technical terms that do not precisely represent the spirit of the present invention, they should be replaced with technical terms that may be correctly understood by those skilled in the art and understood. Furthermore, common terms used in the present invention should be interpreted in accordance with the definition of dictionaries or in accordance with the context and should not be construed as having excessively reduced meanings.

Furthermore, an expression of the singular number used in this specification includes an expression of the plural number unless clearly defined otherwise in the context. In this application, terms, such as "comprise" and "include", should not be construed as essentially including all several elements or several steps described in the specification, but the terms may be construed as not including some of the elements or steps or as including additional element or steps.

Furthermore, terms including ordinal numbers, such as the first and the second used in this specification, may be used to describe a variety of elements, but the elements should not be limited by the terms. The terms are used to only distinguish one element from the other element. For example, a first element may be named a second element and likewise a second element may be named a first element without departing from the scope of the present invention.

When one element is described as being "connected" or "coupled" to the other element, it should be understood that one element may be directly connected or coupled to the other element, but a third element may be interposed between the two elements. In contrast, when one element is described as being "directly connected" or "directly coupled" to the other element, it should be understood that a third element is not interposed between the two elements.

Hereinafter, some exemplary embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. It is also to be noted that the accompanying drawings are provided to only help easily understand the spirit of the present invention and the spirit of the present invention is limited by the accompanying drawings. The spirit of the present invention should be constructed as being extended up to all changes, equivalents, and substitutes in addition to the accompanying drawings.

In the accompanying drawings, User Equipment (UE) is illustrated as an example, but the illustrated UE may also be named a term, such as a terminal or Mobile Equipment (ME). Furthermore, the UE may be a portable device, such as a laptop computer, a mobile phone, a PDA, a smart phone, or a multimedia device, or a non-portable device, such as a PC or a device mounted on a vehicle.

DEFINITION OF TERMS

Prior to reference to the drawings, terms used in this specification are defined in brief in order to help understanding of the present invention.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

WORM is an abbreviation of Wireless LAN (WLAN) Offloading RAT Mobility, and it means technology in which specific data traffic can be offloaded onto a WLAN in accordance with a service provider preference policy when handover between RATs is generated. That is, in the state in which a service provider preference has been set to an E-UTRAN>a WLAN>a UTRAN, if RAT is changed in accordance with handover from the E-UTRAN to the UTRAN, some of data traffic influenced by the handover can be offloaded onto the WLAN.

The present invention is described below with reference to related drawings.

Figure 8:
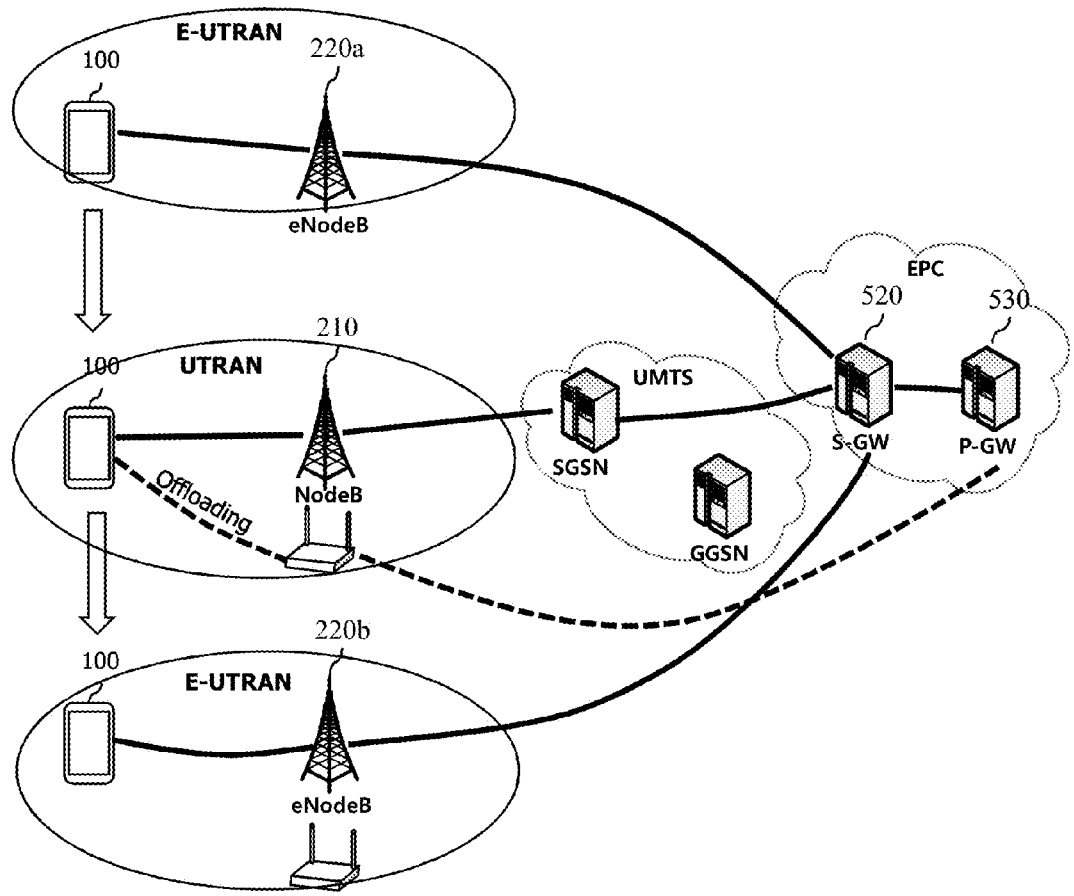
FIG. 8 is an exemplary diagram of a handover situation.

FIG. 8 is an exemplary diagram of a handover situation.

In general, when UE geographically moves to a specific area, a handover procedure is performed. Here, if the same Radio Access Technology (RAT) is not present in the specific area, a handover procedure is generated between RATs. Here, the RAT means a GERAN, a UTRAN, an E-UTRAN, or the like. For example, if UE placed in an E-UTRAN area correspond to a source RAT moves to the UTRAN area corresponding to a target RAT, handover is generated between the RATs.

If a handover is generated between the RATs as described above, a bearer may drop or Quality of Service (QoS) may be lowered due to the QoS of the target RAT, insufficient available radio resources in the target RAT, or a network policy, with the result that service may be interrupted or a user's experience may be degraded. If an available WLAN is present and the WLAN has been configured to be permitted or preferred in such a condition, specific IP data traffic can be offloaded onto the WLAN.

As described above, if handover from an E-UTRAN to the UTRAN is performed, the IP data traffic of UE is offloaded onto the WLAN, and the UE returns to the E-UTRAN, the IP data traffic also returns to the E-UTRAN. That is, a ping-pong occurs.

To be concrete, referring to FIG. 8, UE 100 sends and receives data traffic via the S-GW 520 and the P-GW 530 of an EPC through the eNodeB 220*a* of an E-UTRAN.

Thereafter, the UE 100 geographically moves and performs handover to the NodeB 210 of the UTRAN. Here, QoS provided by the NodeB 210 of the UTRAN is not satisfactory. If a specific affected traffic relatively prefers the WLAN in accordance with a policy (for example, an Inter-System Routing Policy (ISRP)) provided by the ANDSF, the UE 100 offloads the data traffic onto the WLAN. That is, if the policy provided by the ANDSF is set in order of E-UTRAN>WLAN>UTRAN, the UE 100 offloads the data traffic onto the WLAN. That is, the data traffic is offloaded onto the WLAN in accordance with WORM.

If the UE 100 geographically moves to the coverage of the eNodeB 220*b* of an E-UTRAN, however, a handover procedure is performed in order to return the data traffic, offloaded onto the WLAN, to the eNodeB 220*b* of the E-UTRAN. That is, if the policy provided by the ANDSF is set in order of the E-UTRAN>WLAN>UTRAN, the UE 100 performs a handover procedure in order to return the data traffic to the eNodeB 220*b* of the E-UTRAN.

However, if there is an available WLAN within the coverage of the eNodeB 220*b* of the E-UTRAN, to send and receive traffic over the available WLAN may be better than to return the data traffic to the eNodeB 220*b* of the E-UTRAN. Even though, if the data traffic via the WLAN is moved to the eNodeB 220*b* of the E-UTRAN, there is a problem in that many control signals are unnecessarily transmitted and received.

Furthermore, if the UE 100 is placed at the boundary of a cell, RAT handover between the UTRAN and the E-UTRAN will be generated very frequently, which may further aggravate the aforementioned problem.

The transmission and reception of control signals in accordance with a scenario shown in FIG. 8 are described in detail below with reference to FIGS. 9A to 10B.

Figure 9A:
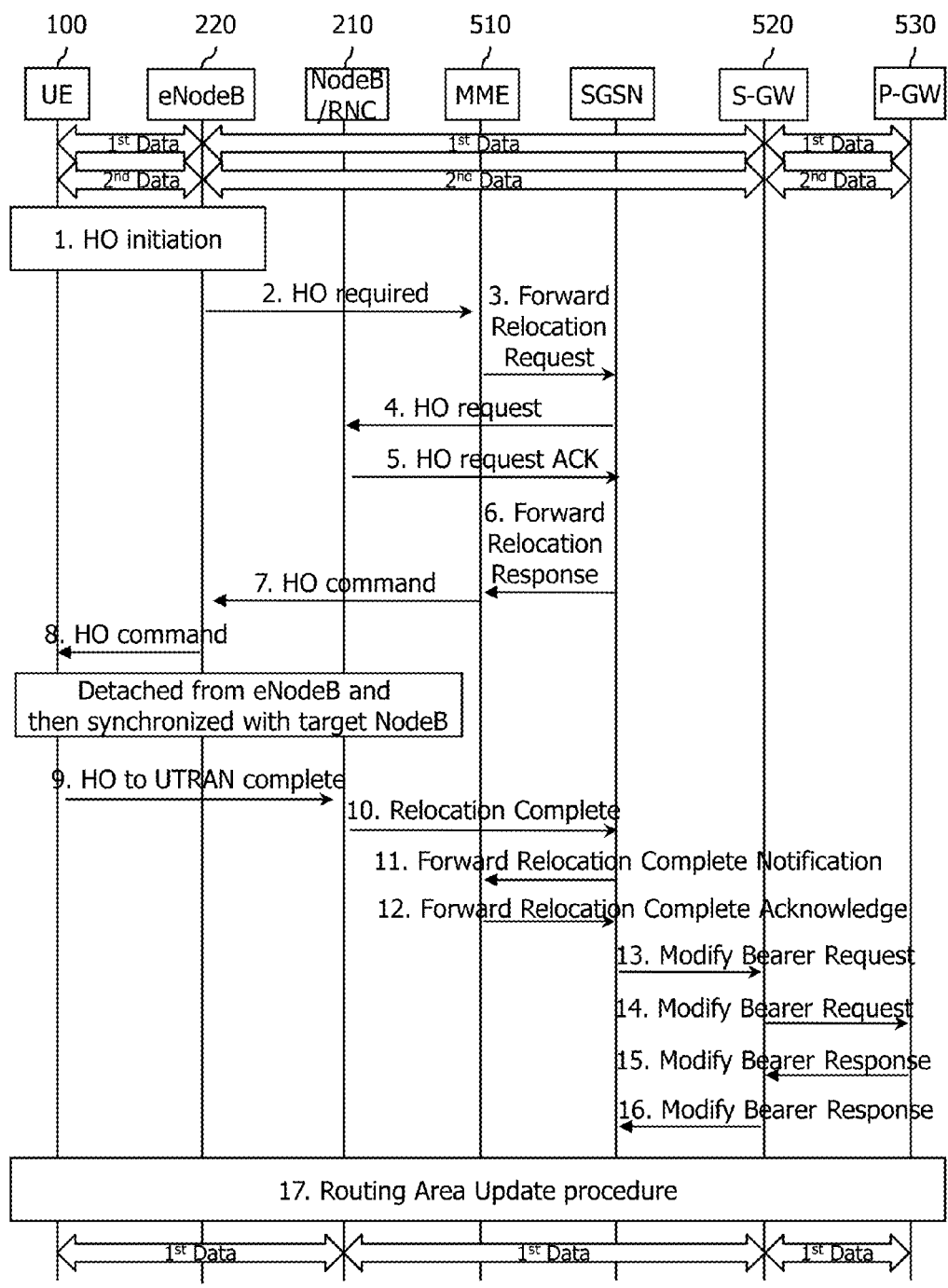
FIG. 9A is a flowchart illustrating the transmission and reception of control signals according to handover to a UTRAN from an E-UTRAN.
Figure 9B:
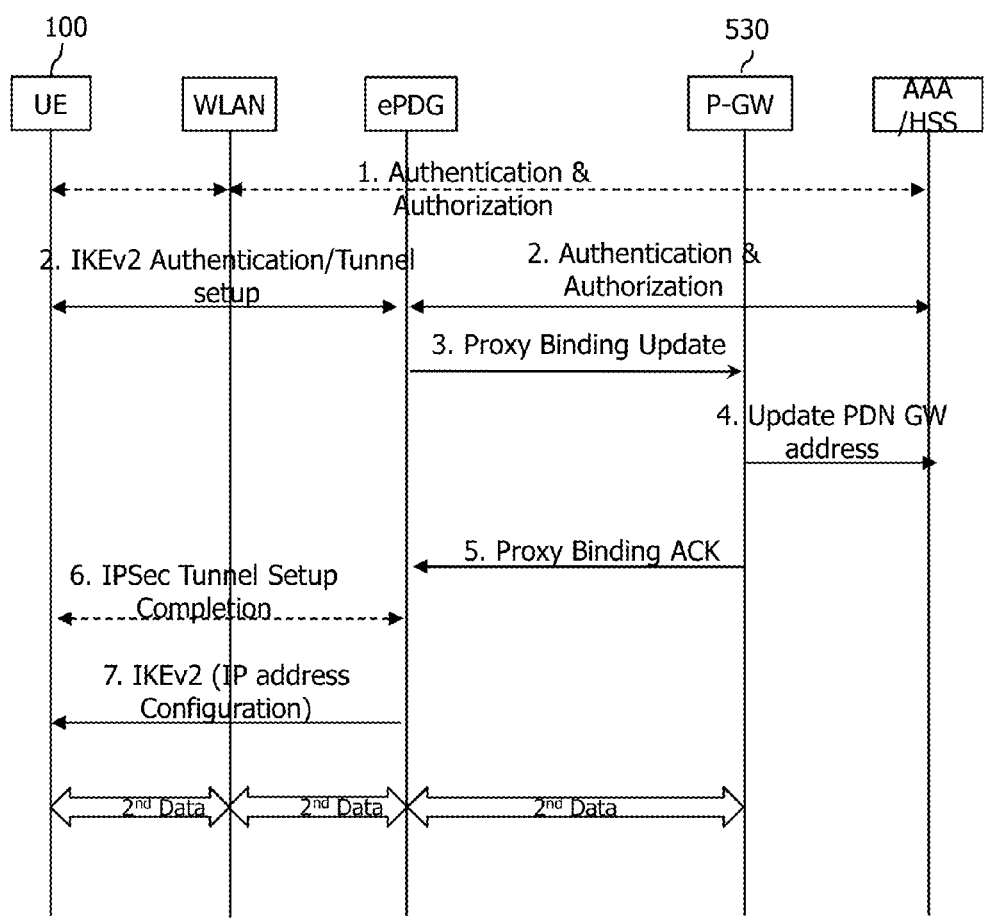
FIG. 9B is a flowchart illustrating the transmission and reception of control signals according to offloading to a WLAN.
Figure 10A:
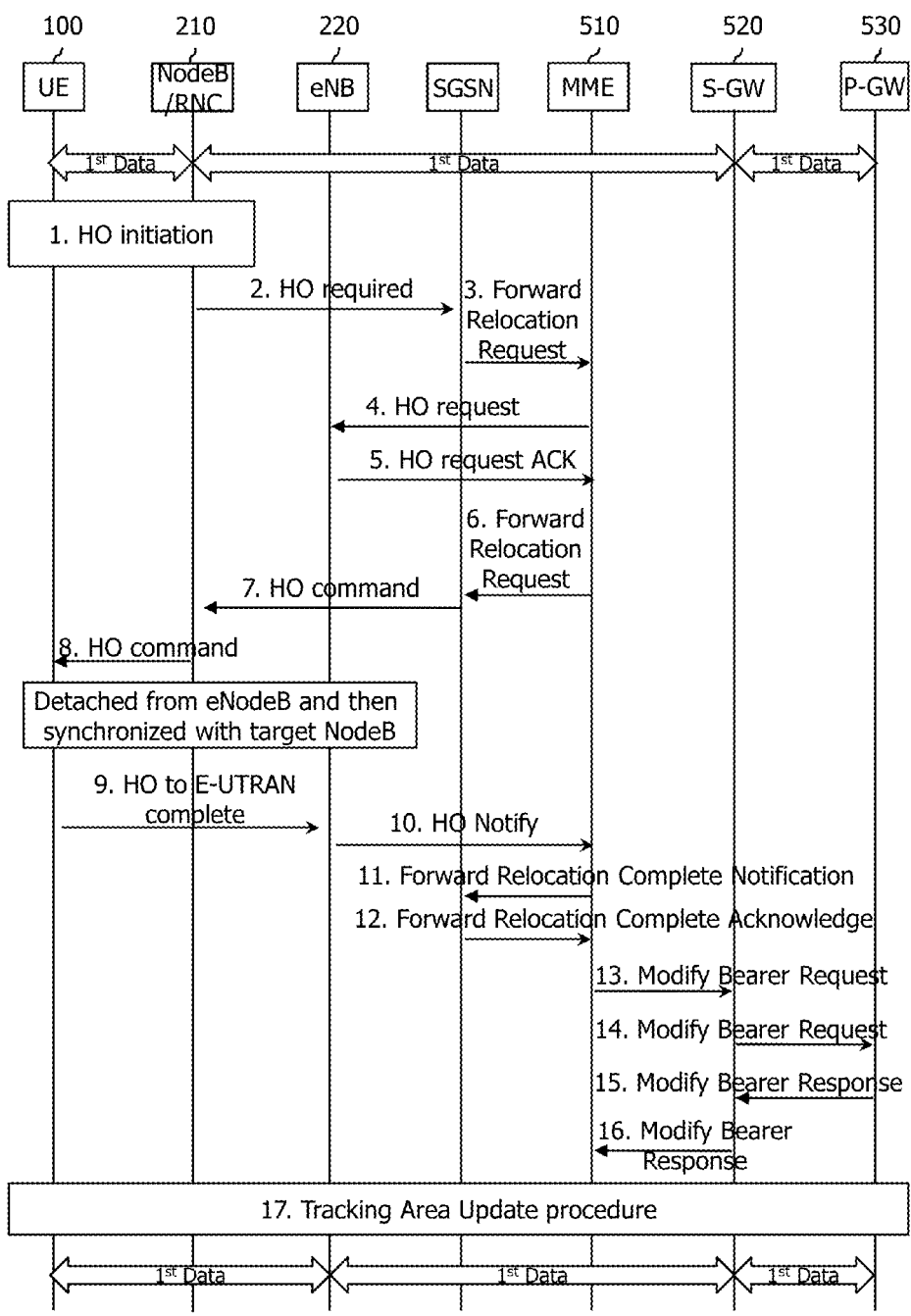
FIG. 10A is a flowchart illustrating the transmission and reception of control signals according to handover from a UTRAN to an E-UTRAN.
Figure 10B:
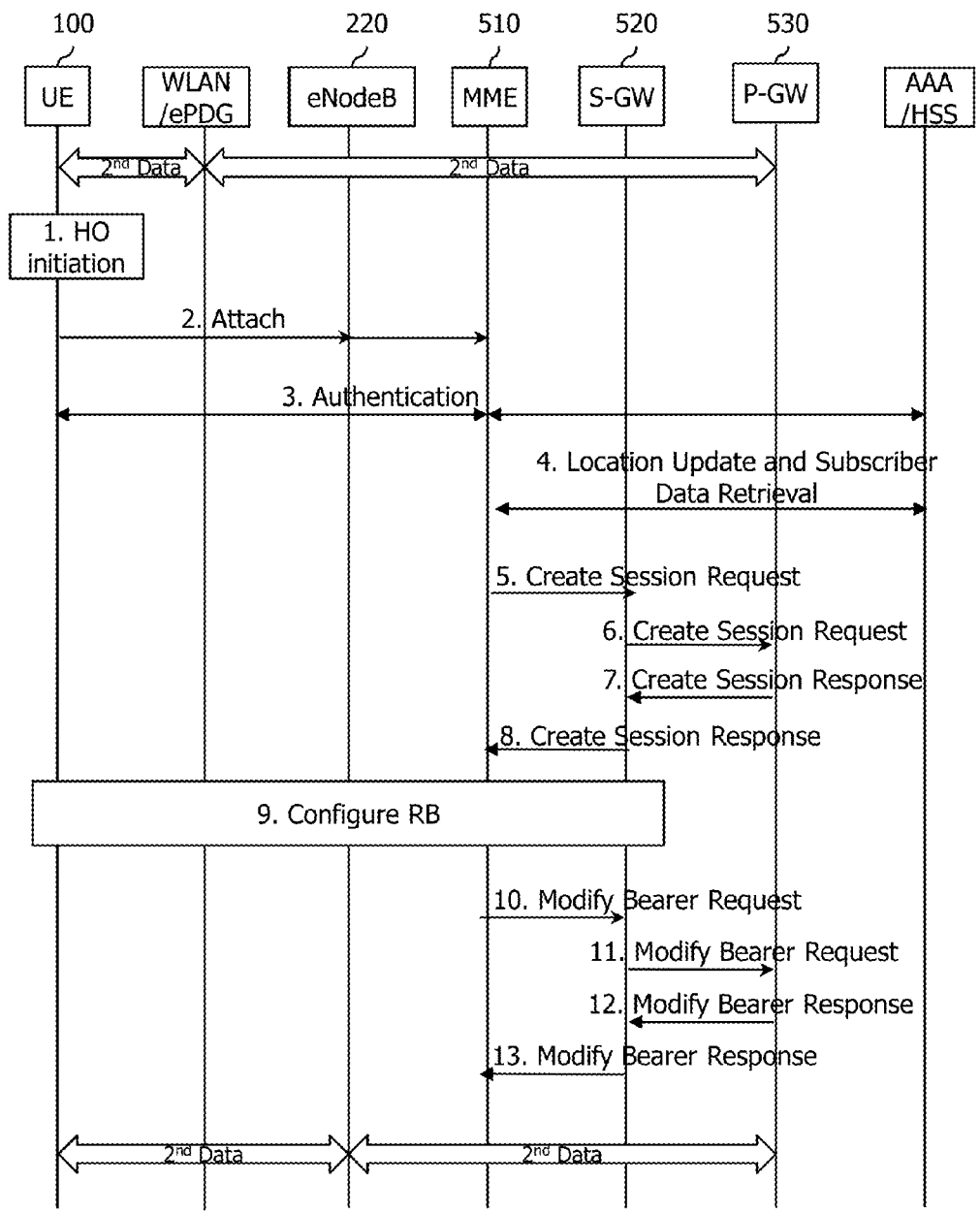
FIG. 10B is a flowchart illustrating the transmission and reception of control signals for transferring traffic, offloaded onto a WLAN, to an E-UTRAN.

FIG. 9A is a flowchart illustrating the transmission and reception of control signals according to handover to the UTRAN from an E-UTRAN, FIG. 9B is a flowchart illustrating the transmission and reception of control signals according to offloading to a WLAN, FIG. 10A is a flowchart illustrating the transmission and reception of control signals according to handover from the UTRAN to an E-UTRAN, and FIG. 10B is a flowchart illustrating the transmission and reception of control signals for transferring traffic, offloaded onto a WLAN, to an E-UTRAN.

As can be seen with reference to FIG. 9A, the UE 100 sends and receives 1st data traffic and 2nd data traffic via the S-GW 520 and the P-GW 530 of the EPC through the eNodeB 220*a* of the E-UTRAN and then moves to the coverage of the NodeB 210 of the UTRAN.

1~2) Accordingly, a handover procedure is initiated, and the eNodeB 220 notifies the MME 510 of the EPC that handover is necessary by sending a handover (HO) required message to the MME 510.

3~4) The MME 510 sends a forward relocation request message to the SGSN of a UMTS. In response thereto, the SGSN sends an HO request message to the NodeB 210.

5~6) The NodeB 210 determines whether or not to assign radio resources and then sends an HO request ACK message to the SGSN. Next, the SGSN sends a forward relocation response message to the MME 510.

7) The MME 510 instructs handover by sending an HO command to the eNodeB 220.

8) In response to the HO command received from the eNodeB 220, the UE 100 is detached from the eNodeB 220, and it performs a synchronization with the NodeB 210.

9) Accordingly, the UE 100 sends a handover complete message to the NodeB 210.

10) In response thereto, the NodeB 210 notifies the SGSN that handover is performed by sending a relocation complete message to the SGSN.

11~12) The SGSN sends an omni-directional relocation complete notification message to the MME 510, and the MME 510 sends an omni-directional relocation complete response message to the SGSN.

13~16) A task for updating bearer context changed due to the handover is performed on the network. To be concrete, the SGSN sends a modify bearer request message to the S-GW 520 and receives a modify bearer response message. A bearer modification procedure between the S-GW 520 and the P-GW 520 may be performed, if necessary.

17) The UE 100 may perform some of a Routing Area Update (RAU) procedure in order to notify a network of a position that has been moved at the last step of the handover procedure.

During such handover, the 2nd data traffic of the UE 100 may not be smoothly transmitted and received due to low QoS provided by the NodeB 210. Here, if preference for the 2nd data traffic is set in order of the E-UTRAN>WLAN>UTRAN in accordance with a policy of the ANDSF, for example, an ISRP, the 2nd data traffic may be offloaded onto the WLAN.

Accordingly, when the handover is completed, the UE 100 may send and receive only the 1st data traffic to and from the P-GW 530 via the S-GW 520 through the NodeB 210.

The 2nd data traffic may be offloaded onto the WLAN in accordance with WORM, as can be seen with reference to FIG. 9B.

Such offloading is described in detail with reference to FIG. 9B.

1) The UE 100 performs an authentication procedure along with an AAA/HSS over the WLAN.

2) The UE 100 performs authentication/tunnel setup through an ePDG.

3~5) The ePDG sends a proxy binding update message to the P-GW 530, and the P-GW 530 sends an update P-GW address message to the AAA/HSS. Next the P-GW 530 sends a proxy binding ACK message to the ePDG.

6~7) Accordingly, tunnel setup between the ePDG and the UE 100 is completed, and the ePDG assigns an IP address to the UE 100.

Accordingly, the 2nd data traffic can be offloaded onto the WLAN.

If the UE 100 geographically moves to the coverage of the eNodeB 220*b* of the E-UTRAN again as shown in FIG. 8, RAT mobility occurs due to handover from the UTRAN to the E-UTRAN. That is, as can be seen with reference to FIG. 10A, control signals are transmitted and received in order to handover 1st data traffic from the NodeB 210 of the UTRAN to the eNodeB 220*b* of the E-UTRAN.

1~2) When the UE 100 moves to the coverage of the eNodeB 220*b* of the E-UTRAN, handover is initiated. The UE 100 sends an attach message to the MME 510 via the eNodeB 220*b*.

3~4) In response thereto, an authentication procedure is performed between the MME 510, the UE 100, and the AAA/

HSS. The MME 510 requests the HSS to update the position and to search for subscriber data.

5~9) When the MME 510 sends a create session request message to the S-GW 520, the S-GW 520 transfers the create session request message to the P-GW 530. Furthermore, when the P-GW 530 sends a create session response message to the S-GW 520, the S-GW 520 transfers the create session response message to the MME 510. Furthermore, a radio bearer is created between the eNodeB 220 and the UE 100.

10~13) The MME 510 sends a modify bearer request message to the S-GW 520, and the S-GW 520 transfers the modify bearer request message to the P-GW 530. The P-GW 530 sends a modify bearer response message to the S-GW 520, and the S-GW 520 transfers the modify bearer response message to the MME 510.

If a policy for specific traffic is set in order of E-UTRAN>WLAN>UTRAN as described above when the UE 100 moves the coverage of the eNodeB 220 of the E-UTRAN again, the 2nd data traffic offloaded onto the WLAN is also handovered to the eNodeB 220 of the E-UTRAN. Such handover is described in detail below with reference to FIG. 10B.

1~2) If a policy is set in order of E-UTRAN>WLAN>UTRAN, a handover procedure is initiated, and the UE 100 sends an attach message to the MME 510 via the eNodeB 220.

3~4) Accordingly, an authentication procedure is performed between the MME 510, the UE 100, and the AAA/HSS, and the MME 510 requests the HSS to update the position and to search for subscriber data.

5~9) When the MME 510 sends a create session request message to the S-GW 520, the S-GW 520 transfers the create session request message to the P-GW 530. Furthermore, when the P-GW 530 sends a create session response message to the S-GW 520, the S-GW 520 transfers the create session response message to the MME 510. Furthermore, a radio bearer is created between the eNodeB 220 and the UE 100.

10~13) The MME 510 sends a modify bearer request message to the S-GW 520, and the S-GW 520 transfers the modify bearer request message to the P-GW 530. The P-GW 530 sends a modify bearer response message to the S-GW 520, and the S-GW 520 sends the modify bearer response message to the MME 510.

Through the transmission and reception of such control signals, the 2nd data traffic offloaded onto the WLAN is transferred to the eNodeB 220 of the E-UTRAN gain.

If an available WALN is present within the coverage of the eNodeB 220b of the E-UTRAN, it would be better to send and receive the 2nd data traffic over the available WALN than to send and receive many control signals in order to transfer the 2nd data traffic, offloaded onto the WLAN, to the eNodeB 220 of the E-UTRAN as described above.

Furthermore, if the UE 100 is placed at the boundary of a cell, RAT handover will be generated very often between the UTRAN and the E-UTRAN, which will aggravate the aforementioned problem.

Figure 11A:
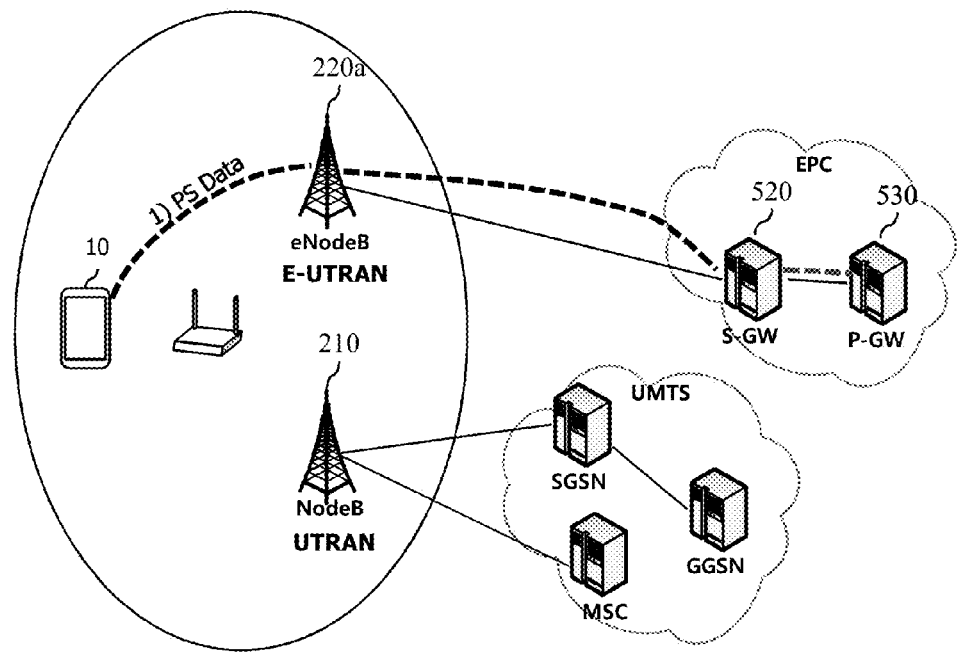
FIGS. 11A to 11C are exemplary diagrams of a CSFB situation.
Figure 11B:
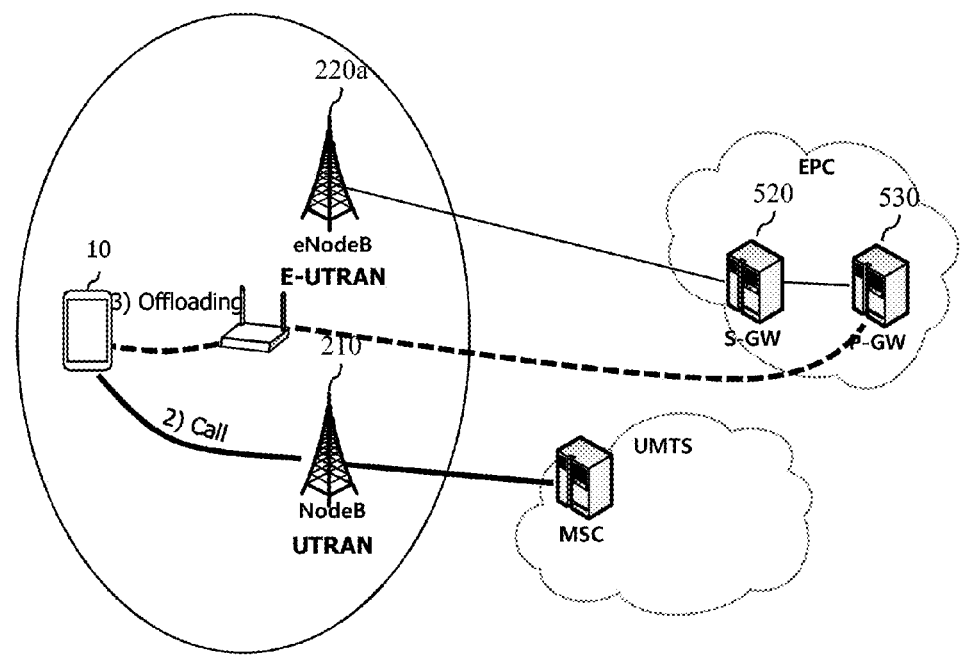
Figure 11C:
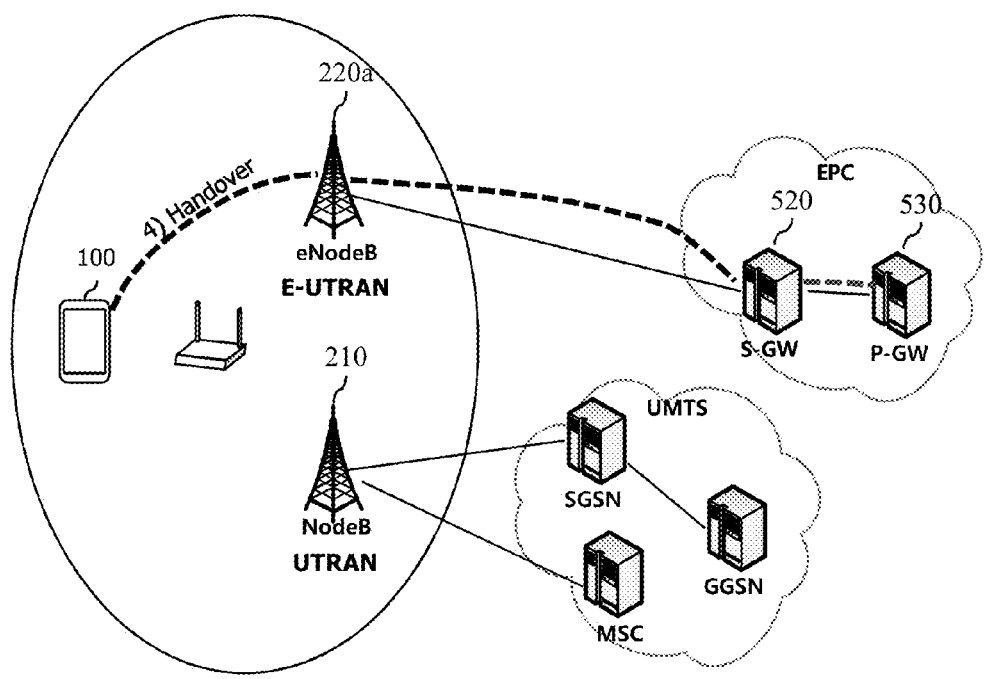

FIGS. 11A to 11C are exemplary diagrams of a Circuit Switched Fall-Back (CSFB) situation.

If UE placed in an area where an E-UTRAN is possible does not support Voice over LTE (VoLTE), the UE camps on an UTRAN in accordance with a CSFB mechanism in order to send or receive a call. Here, if there is IP data traffic performed by the UE, the IP data traffic is suspended in case the PS Handover is not supported. Alternatively, if an available WLAN is present and the WLAN is preferred, the IP data traffic may be offloaded onto the WLAN in accordance with a ISRP provided by the ANDSF.

When the UE camps on the UTRAN in accordance with the CSFB mechanism as described above, the IP data traffic of the UE is offloaded onto the WLAN, and the call is then terminated. If the UE returns to the E-UTRAN, the IP data traffic is also returned to the E-UTRAN. That is, ping-pong is generated.

This is described in detail with reference to FIG. 11A. In a situation in which the UE 100 is placed in an area where both the UTRAN and the E-UTRAN are possible, the UE 100 sends and receives data traffic via the S-GW 520 and the P-GW 530 of the EPC through the eNodeB 220a of the E-UTRAN.

Thereafter, as can be seen with reference to FIG. 11B, if the UE 100 wants to send or receive a call, the UE 100 camps on the NodeB 210 of the UTRAN in accordance with the CSFB mechanism. Here, if QoS provided by the NodeB 210 of the UTRAN is not satisfactory or there is affected traffic because PS handover itself is not provided, the UE 100 offloads the corresponding data traffic onto a WLAN if the WLAN has higher preference for the data traffic in accordance with a policy provided by the ANDSF, for example, an ISRP. That is, if the policy provided by the ANDSF is set in order of E-UTRAN>WLAN>UTRAN, the UE 100 offloads the data traffic onto the WLAN.

As can be seen with reference to FIG. 11C, when the call of the UE 100 is terminated, the UE 100 performs a handover procedure in order to return the data traffic, offloaded onto the WLAN, to the eNodeB 220b of the E-UTRAN. That is, if the policy provided by the ANDSF is set in order of E-UTRAN>WLAN>UTRAN, the UE 100 performs a handover procedure in order to return the offloaded data traffic to the eNodeB 220b of the E-UTRAN.

However, it may be better to send and receive the offloaded data traffic over the WLAN than to return the data traffic to the eNodeB 220b of the E-UTRAN. Even though, if the offloaded data traffic via the WLAN is moved to the eNodeB 220b of the E-UTRAN, there is a problem in that many control signal are unnecessarily transmitted and received.

The transmission and reception of control signals according to scenarios shown in FIGS. 11A to 11C are described in detail below with reference to related drawings.

Figure 12A:
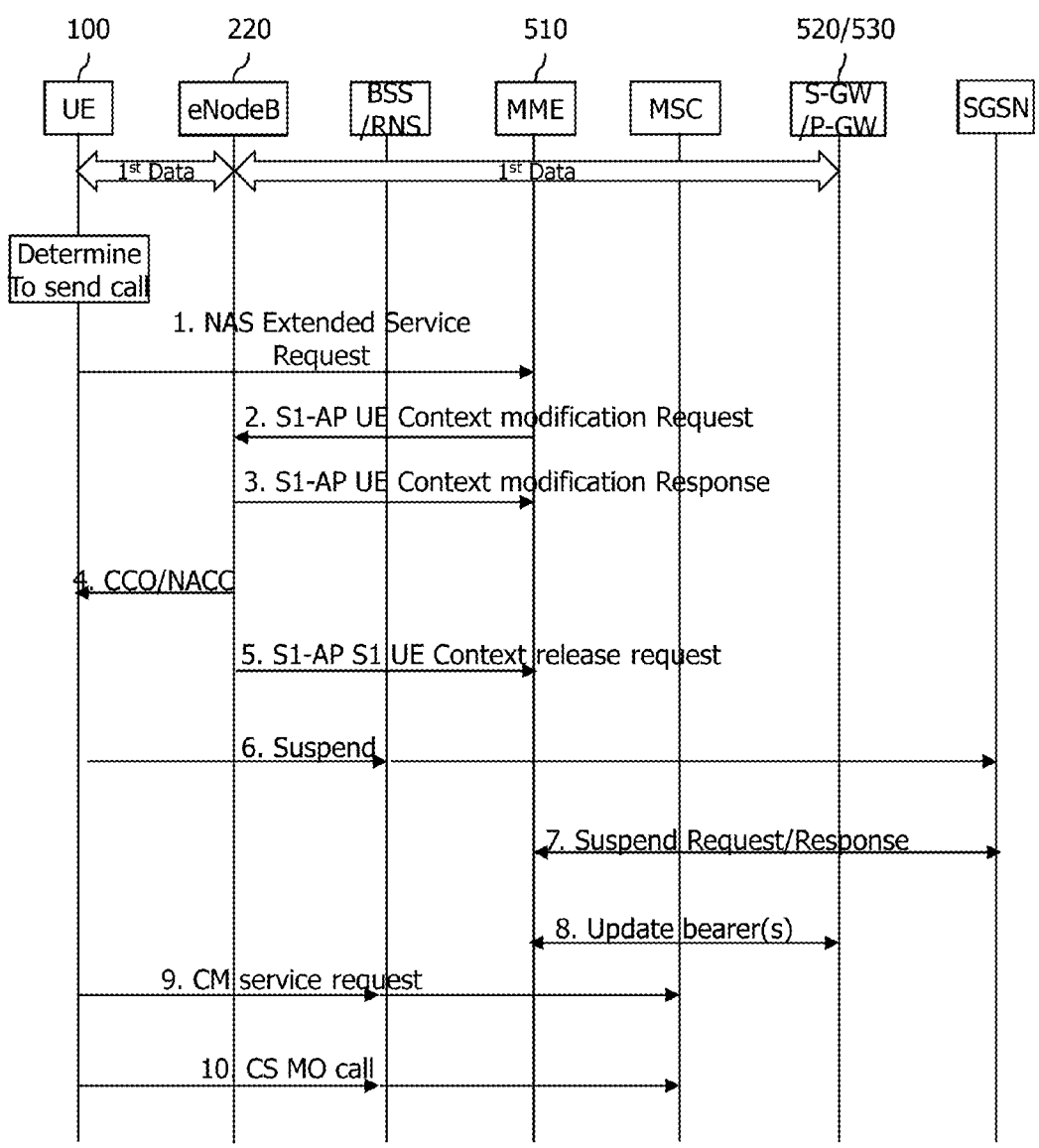
FIG. 12A is a flowchart illustrating the transmission and reception of control signals according to a CSFB mechanism.
Figure 12B:
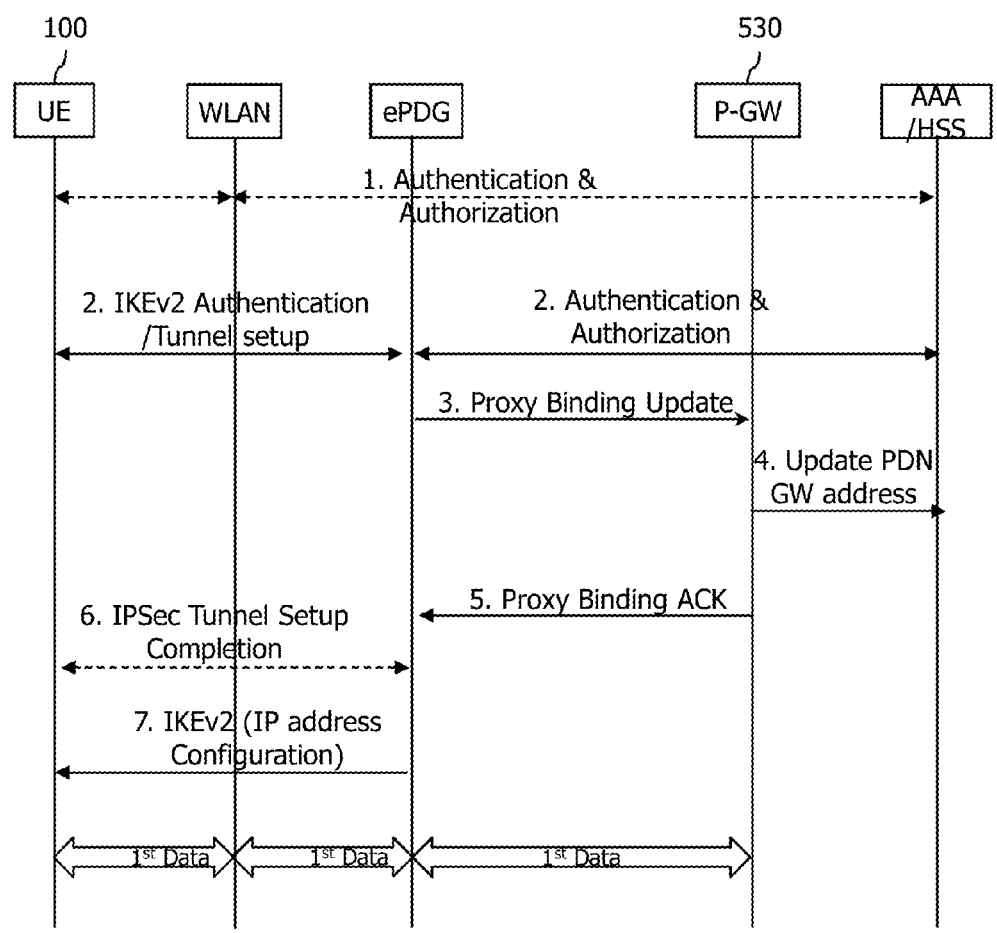
FIG. 12B is a flowchart illustrating the transmission and reception of control signals according to offloading onto a WLAN.
Figure 13:
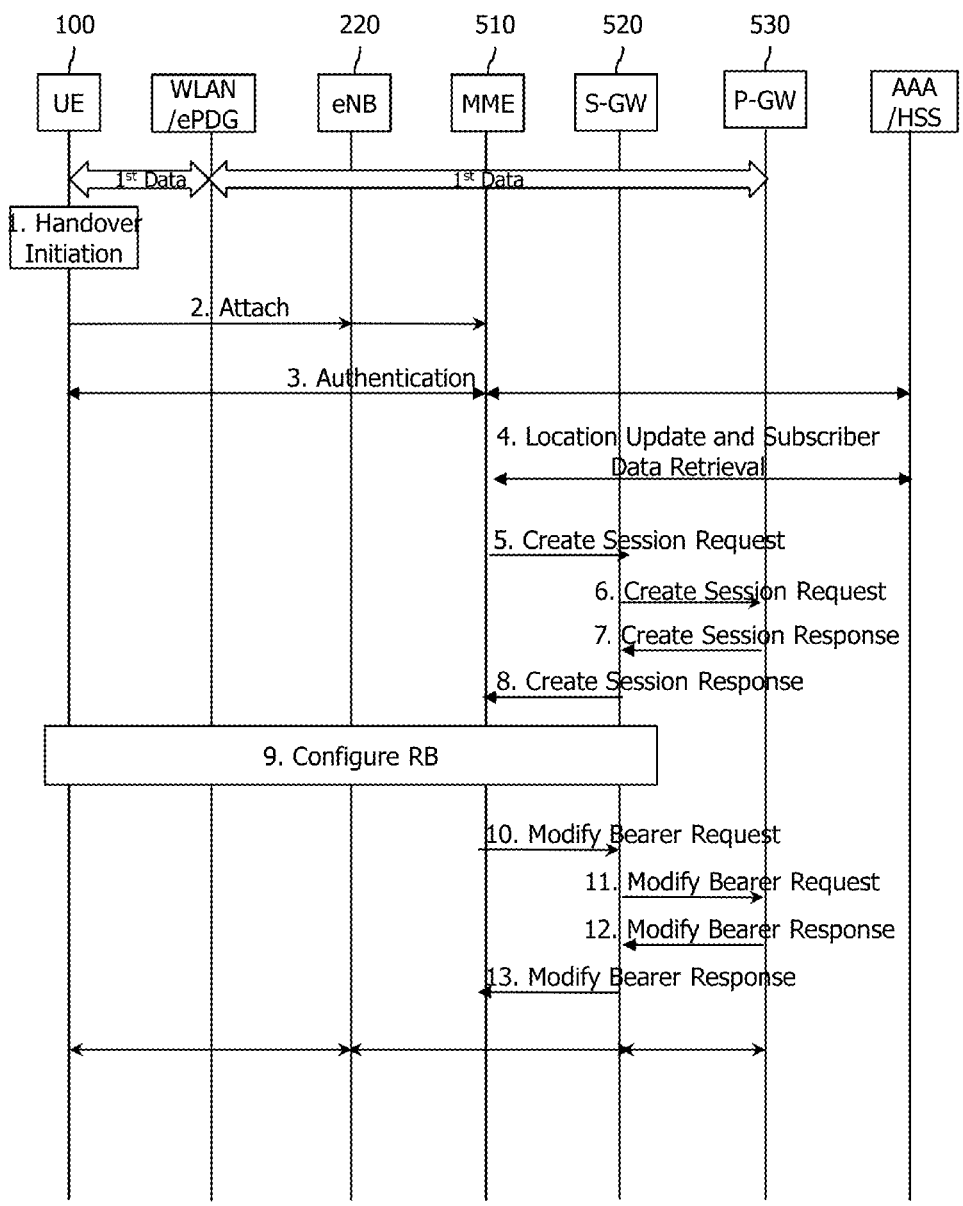
FIG. 13 is a flowchart illustrating the transmission and reception of control signals for transferring traffic, offloaded onto a WLAN, to an E-UTRAN in accordance with the termination of a call.

FIG. 12A is a flowchart illustrating the transmission and reception of control signals according to a CSFB mechanism, and FIG. 12B is a flowchart illustrating the transmission and reception of control signals according to offloading onto a WLAN, and FIG. 13 is a flowchart illustrating the transmission and reception of control signals for transferring traffic, offloaded onto a WLAN, to an E-UTRAN in accordance with the termination of a call.

As can be seen with reference to FIG. 12A, the UE 100 transmits and receives 1st data traffic via the S-GW 520 and the P-GW 530 of the EPC through the eNodeB 220 of the E-UTRAN and determines to send a call.

1) Accordingly, the UE 100 sends an extended service request message (e.g., the extended service request message of the NAS layer) to the MME 510.

2~3) In response thereto, the MME 510 sends a context modification request message (e.g., a UE context modification request message based on an S1-AP) to the eNodeB 220. The eNodeB 220 sends a context modification response message (e.g., a UE context modification response message based on the S1-AP) to the MME 510.

4~5) In order to notify CSFB, the eNodeB 220 sends a CCO/NACC message to the UE 100. Next, the eNodeB 220 sends a context release request message (e.g., an S1 UE context release request message based on the S1-AP) to the MME 510.

6~7) If the 1st data traffic that is in progress is no longer progressed in accordance with the CSFB, the UE 100 requests the suspension of the 1st data traffic from a BSS/RNS, and the BSS/RNS transfers the suspension request to the SGSN. The SGSN sends a suspend request to the MME 510, and the MME 510 sends a suspend response to the MME 510.

8) A bearer update procedure is performed between the MME 510 and the S-GW 520/P-GW 530.

9~10) The UE 100 sends a CM service request message to an MSC and then sends a CS Mobile Orienting (MO) call signal to the MSC in order to send a call.

If, as described above, the 1st data traffic is no longer performed in accordance with the CSFB, the 1st data traffic is suspended. If an available WLAN is present and the available WLAN is preferred in accordance with a policy for the 1st data traffic, the 1st data traffic may be offloaded onto the available WLAN. Such offloading is described below with reference to FIG. 12B.

1) As can be seen with reference to FIG. 12B, the UE 100 performs an authentication procedure along with the AAA/HSS over a WLAN.

2) The UE 100 performs authentication/tunnel setup via the ePDG.

3~5) The ePDG sends a proxy binding update message to the P-GW 530, and the P-GW 530 sends an update P-GW address message to the AAA/HSS. Thereafter, the P-GW 530 sends a proxy binding response (e.g., proxy binding ACK) message to the ePDG.

6~7) In response thereto, tunnel setup between the ePDG and the UE 100 is completed, and the ePDG assigns an IP address to the UE 100.

Accordingly, the 1st data traffic can be offloaded onto the WLAN.

As shown in FIG. 11C, if a policy for offloaded traffic is set in order of E-UTRAN>WLAN>UTRAN when the UE 100 terminates a call, RAT mobility to the E-UTRAN is generated again. For the change of RAT, control signals are transmitted and received again.

If RAT change to the E-UTRAN occurs again due to the termination of the call, the 1st data traffic offloaded onto the WLAN is transferred to the E-UTRAN again. Such a process is described in detail below with reference to FIG. 13.

1~2) If a policy is set in order of the E-UTRAN>WLAN>UTRAN when the UE 100 terminates a call, a handover procedure is initiated, and the UE 100 sends an attach message to the MME 510 via the eNodeB 220.

3~4) Accordingly, an authentication procedure is performed between the MME 510, the UE 100, and the AAA/HSS, and the MME 510 requests the HSS to update the position and to search for subscriber data.

5~9) When the MME 510 sends a create session request message to the S-GW 520, the S-GW 520 transfers the create session request message to the P-GW 530. Furthermore, when the P-GW 530 sends a create session response message to the S-GW 520, the S-GW 520 transfers the create session response message to the MME 510. Furthermore, a radio bearer is created between the eNodeB 220 and the UE 100.

10~13) The MME 510 sends a modify bearer request message to the S-GW 520, and the S-GW 520 transfers the modify bearer request message to the P-GW 530. The P-GW 530 sends a modify bearer response message to the S-GW 520, and the S-GW 520 transfers the modify bearer response message to the MME 510.

Through the transmission and reception of such control signals, the 1st data traffic offloaded onto the WLAN is transferred to the eNodeB 220 of the E-UTRAN again.

If an available WALN is present within the coverage of the eNodeB 220b of the E-UTRAN, it would be better to send and receive the 1st data traffic, offloaded onto the WLAN, over the available WALN than to send and receive many control signals in order to transfer the 1st data traffic to the eNodeB 220 of the E-UTRAN again as described above.

Furthermore, if the UE 100 repeatedly attempts a call, the aforementioned problem will be further aggravated.

Accordingly, solutions for solving such a problem are proposed below.

<A Brief Description of Solutions Proposed by this Specification>

In order to solve the aforementioned problems, embodiments proposed by this specification provide methods for effectively supporting Packet Switched (PS) handover between a 3GPP access network and a WLAN, that is, Wi-Fi.

The embodiments proposed by this specification have been illustrated by taking a relation between an E-UTRAN, a WLAN, and the UTRAN as an example, but they are not limited to such a scenario. The embodiments can be applied to all scenarios in which PS handover is necessary for all bearer or some of bearers (or some PDNs or some IP flows) from cellular access to a WLAN in accordance with the priority of an access network type in the state in which Wi-Fi and cellular access are available for UE. For example, the embodiments can be applied to a scenario in which if all bearers or some PS bearers are offloaded onto a WLAN when there is RAT mobility or RAT change from an E-UTRAN to the UTRAN/GERAN in accordance with the CSFB mechanism, all the bearers or some PS bearers are offloaded onto the E-UTRAN again.

Messages to be described below are described in the form of information that is additional to conventional messages, but they may be included in conventional various messages that are not described and new messages or parameters may be added to the messages to be described below.

Order of steps to be described below may be changed or the steps may be performed at the same time. Furthermore, all the aforementioned steps do not need to be essentially performed, and the steps may be partially combined and performed.

Pieces of information to be described below may be processed along with other pieces of information or transferred as implicative meanings although corresponding information is not directly included.

Embodiments proposed by this specification are described in brief below.

To transfer IP data traffic, offloaded onto a WLAN, to an E-UTRAN may be effective in a specific case, or to place the offloaded IP data traffic in a WLAN may be effective in a specific case.

A determination of the two cases is made depending on preference of an HPLM/VPLMN service provider policy and a user, a user's subscriber information such as membership level, condition information, such as the intensity of a signal of and a load degree of each access, and a roaming policy.

First, if it is effective to return IP data traffic, offloaded onto a WLAN, to an E-UTRAN, a policy provided by the ANDSF, for example, an ISRP may be set so that the E-UTRAN always has the highest priority in order to transfer the IP data traffic to the E-UTRAN.

Next, if it is effective to not return IP data traffic, offloaded onto a WLAN, to an E-UTRAN, one of methods described below or combinations of the methods may be used.

A. To set only a relation with access having lower priority than a WLAN, such as WLAN>UTAN, may be better than to set order of the E-UTRAN>WLAN>UTRAN in a policy provided by the ANDSF, for example, an ISRP.

B. A policy that is available when IP data traffic is transferred to an E-UTRAN may be additionally set. That is, a condition that a policy for transferring IP data traffic to an E-UTRAN is used may be set.

In other words, since a policy may be used when IP data traffic is not transferred to an E-UTRAN, the following contents may be considered as describing a condition that a policy for moving to a specific RAT or staying in a current RAT is considered or other operations at this time.

(1) If Trace Management is Performed on IP Data Traffic (i.e., History Management)

Marking and trace are performed on IP data traffic that has been offloaded onto a WLAN during a handover process. The marking and trace can be recorded/stored/managed by UE and a network. Information about the marking and trace can be included in UE context information and maintained/managed although subsequent another handover and location update are generated. The information about the marking and trace may be used as one of an identifier and a condition in which a policy for returning IP data traffic to an E-UTRAN is used.

(2) If Trace Management is not Performed on IP Data Traffic

If a UE recognizes a specific situation as follows (but not limited to the following list) in accordance with a policy received from a service provider, the UE may use the policy as one of an identifier and a condition in which a policy for moving to a specific RAT or staying in a current RAT is considered (or applied/used). For example, CSFB may be used as one of an identifier and a condition in which a policy for returning to an E-UTRAN is considered (or applied/used) when the termination of CS voice call service is recognized. Furthermore, CSFB may be used as one of an identifier and a condition in which a policy for returning to an E-UTRAN is considered (or applied/used) when information about the intensity of a signal or a traffic load of a WLAN is recognized.

The operations of UE in accordance with the embodiments proposed by this specification are described in brief below.

First, UE receives a policy for priority/preference for an access network, for example, an ISRP from the ANDSF. Here, the priority/preference for the access network may include subdivided priority between RATs, that is, E-UTRAN>WLAN>UTRAN. In accordance with an embodiment proposed by this specification, the policy provided by the ANDSF, for example, the ISRP may include an additional condition and a policy for solving the aforementioned ping-pong problem. The additional condition and policy may include a condition on which a point of time/situation in which a return to 3GPP RAT after offloading onto a WLAN is determined can be recognized. Furthermore, the additional condition and policy may include an available access network and priority/preference and a condition on which the available access network can be used when a return to 3GPP RAT after offloading onto a WLAN is recognized.

Accordingly, when UE determines to return to the original RAT after offloading onto a WLAN, the following pieces of information may be used. The pieces of information may include, for example, trace information for previously offloaded traffic, information about the termination of a CS voice call according to CSFB, information indicating that a timer started in response to offloading onto a WLAN has expired, information about whether or not traffic handovered to another 3GPP RAT without being offloaded onto a WLAN is handovered again, and information about whether or not the intensity of a signal of a WLAN is weakened again or about the load of a WLAN.

On the one hand, in order to solve the aforementioned ping-pong problem, if a policy provided by the ANDSF, for example, an ISRP is improved in accordance with an embodiment proposed by this specification, the following process may be performed. The improved policy provided by the ANDSF, for example, the ISRP needs to be set regarding whether a WLAN is preferred over any 3GPP RAT, and the improved policy should not be set to a 3GPP RAT that is preferred over a WLAN.

On the other hand, in order to solve the aforementioned ping-pong problem, if a timer is used or marking and trace are performed in accordance with an embodiment proposed by this specification, the following process may be performed.

(1) Detection and Running of a Timer by UE

If some of bearers are lost due to RAT mobility attributable to a geographical movement, UE can detect the lost bearers. To be concrete, if UE receives an HO command as RAT mobility is generated, the UE can be aware that which bearer corresponding to a PDN connection is released based on information within the HO command. Here, if the bearer released according to handover is offloaded onto a WLAN, the UE may run a timer. Thereafter, although a current RAT is changed to the original RAT again as the UE geographically moves, the UE can prevent data traffic through the bearer offloaded onto the WLAN from being transferred to the original RAT during the time for which the timer is run.

In another embodiment, if a bearer for IP data traffic is suspended in accordance with the CSFB mechanism, UE can detect the suspension of the bearer. To be concrete, the UE can be aware of the suspension of the bearer because it starts a suspension procedure. Here, if the suspended bearer is offloaded onto a WLAN, the UE can run a timer. The UE can prevent data traffic through the bearer offloaded onto the WLAN from being transferred to the original RAT during the time for which the timer is run.

(2) Detection and Marking by UE

If some of bearers are lost due to RAT mobility attributable to a geographical movement, UE can detect the lost bearers. To be concrete, if a bearer is offloaded onto a WLAN as RAT mobility is generated, UE can perform marking on the traffic of the offloaded bearer. Thereafter, although a current RAT is changed to the original RAT again as the UE geographically moves, the UE can prevent the marked traffic from being transferred to the original RAT again.

In another embodiment, if a bearer for IP data traffic is suspended in accordance with the CSFB mechanism, UE can detect the suspension of the bearer. Here, if the suspended bearer is offloaded onto a WLAN, the UE can perform marking on data traffic through the bearer offloaded onto the WLAN. The UE can prevent the marked data traffic from being transferred to the original RAT again although a voice call is terminated.

Solutions according to first and second embodiments of this specification to a situation in which data traffic is offloaded onto a WLAN due to RAT mobility attributable to a geographical movement are described with reference to FIGS. 14 to 16. Furthermore, solutions according to third and fourth embodiments of this specification to a situation in which data traffic is offloaded onto a WLAN in accordance with the CSFB mechanism are described with reference to changes of FIGS. 17 to 19.

Figure 14:
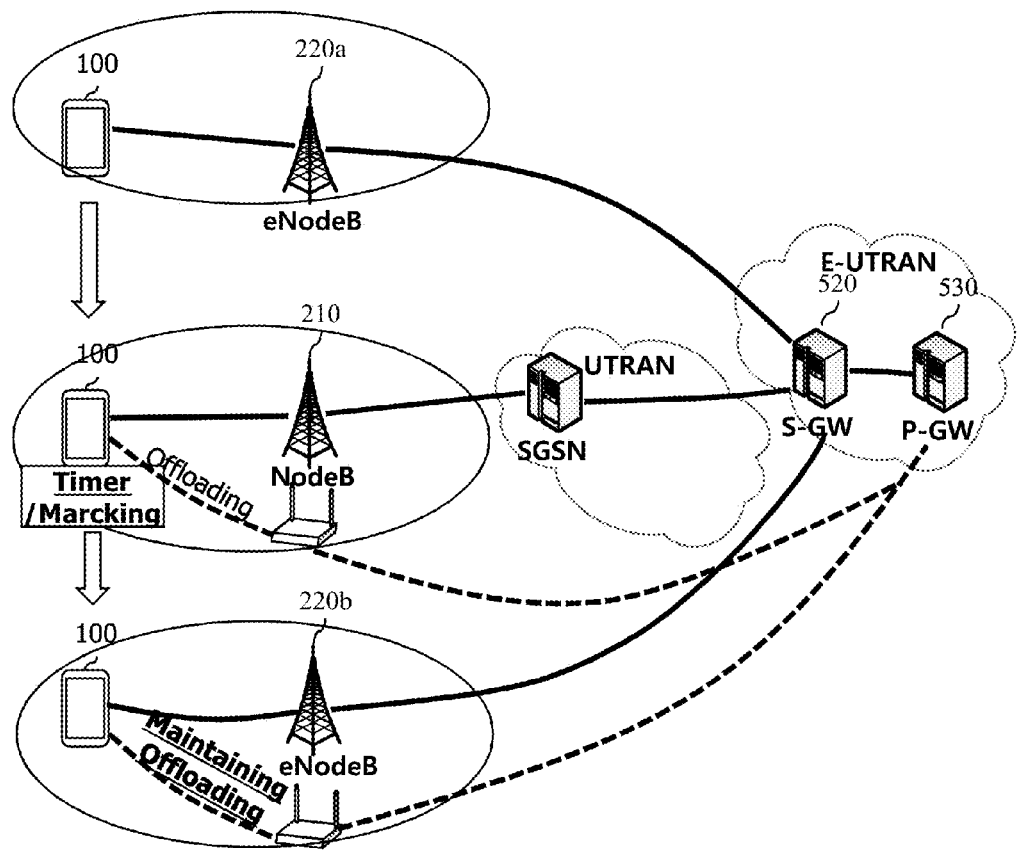
FIG. 14 is a conceptual diagram showing solutions according to a first embodiment and a second embodiment for solving a problem that may occur after data traffic is offloaded onto a WLAN owing to RAT mobility attributable to a geographical movement.

FIG. 14 is a conceptual diagram showing solutions according to the first embodiment and the second embodiment for solving a problem that may occur after data traffic is offloaded onto a WLAN owing to RAT mobility attributable to a geographical movement.

As can be seen with reference to FIG. 14, when handover from the E-UTRAN to the UTRAN is performed, if QoS provided by the NodeB 210 of the UTRAN is low and a policy provided by the ANDSF, for example, an ISRP is set in order of E-UTRAN>WLAN>UTRAN for the affected IP traffic by handover, the IP data traffic of the UE may be offloaded onto the WLAN. If the UE returns to the E-UTRAN, a timer may be used in accordance with the first embodiment of this specification or a marking and trace scheme may be used in accordance with the second embodiment in order to prevent the IP data traffic offloaded onto the WLAN from being transferred to the E-UTRAN again.

Figure 15:
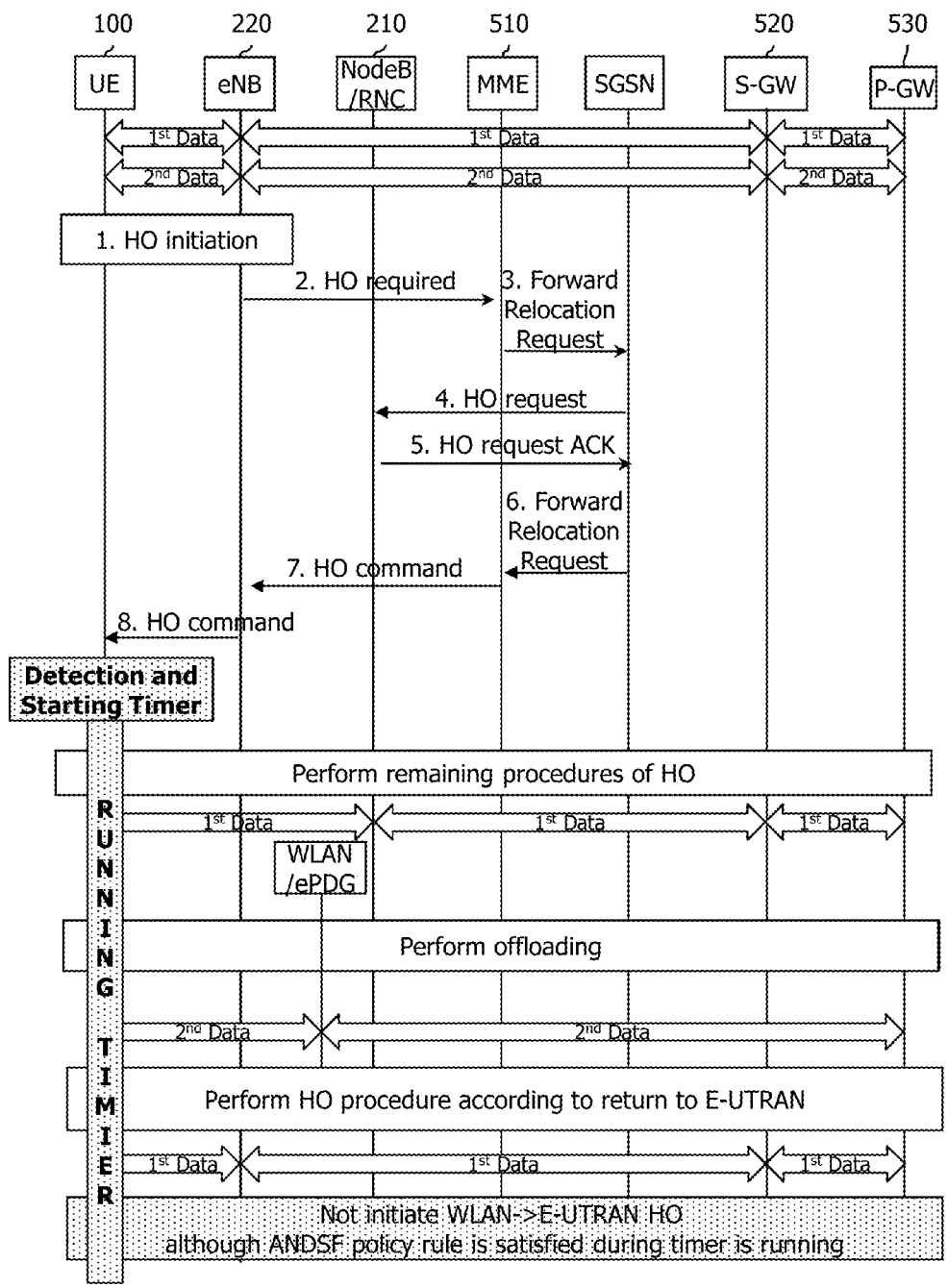
FIG. 15 is a detailed flowchart illustrating the first embodiment conceptually shown in FIG. 14.

FIG. 15 is a detailed flowchart illustrating the first embodiment conceptually shown in FIG. 14.

As can be seen with reference to FIG. 15, the UE 100 progresses 1st data traffic and 2nd data traffic via the S-GW 520 and the P-GW 530 of the EPC through the eNodeB 220 of the E-UTRAN and moves to the coverage of the NodeB 210 of the UTRAN.

1~2) In response thereto, handover is initiated, and the eNodeB 220 notifies the MME 510 of the EPC that handover is necessary by sending a handover (HO) required message to the MME 510 of the EPC.

3~4) The MME 510 sends a forward relocation request message to the SGSN of an UMTS. In response thereto, the SGSN sends an HO request message to the NodeB 210.

5~6) The NodeB 210 determines whether or not to assign radio resources and sends an HO request ACK message to the SGSN. Next, the SGSN sends a forward relocation response message to the MME 510.

7) The MME 510 instructs the handover by sending an HO command to the eNodeB 220.

8) The eNodeB 220 sends the HO command to the UE 100.

Here, the UE 100 can detect whether or not a bearer for the 2nd data traffic is released based on information within the HO command. Furthermore, if a policy provided by the ANDSF for the 2nd data traffic, for example, an ISRP is set in order of the E-UTRAN>WLAN>UTRAN, the UE 100 may determine to offload the 2nd data traffic to the WLAN and run the timer.

Next, when the remaining procedures of the handover are performed, the 1st data traffic is transmitted and received via the NodeB 210 of the UTRAN.

Furthermore, in accordance with the determination, the 2nd data traffic is offloaded onto the WLAN.

Thereafter, if the UE 100 geographically moves and returns to the area of the E-UTRAN, a handover procedure from the UTRAN to the E-UTRAN is performed.

When the handover is performed, the 1st data traffic is transmitted and received via the eNodeB 220 of the E-UTRAN.

However, a handover procedure for transferring the 2nd data traffic offloaded onto the WLAN to the E-UTRAN is not performed although E-UTRAN>WLAN>UTRAN set in the policy provided by the ANDSF for the 2nd data traffic, for example, the ISRP is satisfied before the timer expires.

In the first embodiment, a point of time at which the timer is run may be changed as in modification examples below. However, the point of time is not limited as in the following modification examples, but may be changed in various ways.

In a first modification example, when the UE 100 receives an HO command from an eNodeB during a PS handover procedure between 3GPP RATs, the UE 100 may recognize the occurrence of a lost bearer or recognize that there is a bearer having reduced QoS and then run a timer at a specific point of time. Here, the UE 100 may start offloading onto a WLAN simultaneously with the running of the timer. For example, the specific point of time may be a point of time after it is determined that data traffic through the bearer can be offloaded onto the WLAN. For another example, the specific point of time may be a point of time after it is determined that data traffic through the bearer can be offloaded onto the WLAN since a handover procedure is fully completed.

In a second modification example, after a PS handover procedure between 3GPP RATs is completed, if UE recognizes the occurrence of a lost bearer or recognizes that there is a bearer having reduced QoS and then determines that data traffic through the bearer can be offloaded onto a WLAN, the UE may run a timer.

In a third modification example, after offloading onto a WLAN is successfully performed, UE may run a timer. If the offloading fails, the UE may not run the timer.

In a fourth modification example, UE may run a timer if data traffic offloaded onto a WLAN still remains at a point of time at which a handover procedure from a UTRAN to an E-UTRAN is started. Here, if the offloaded data traffic is terminated, the timer does not need to be started. The reason why the timer is run at the point of time at which the handover procedure from the UTRAN to the E-UTRAN is started as described above is to prevent the offloaded traffic from being immediately transferred to the E-UTRAN again when the time of the timer is short. That is, this is for making traffic offloaded onto a WLAN stay as long as possible.

As described above, if the timer proposed by the first embodiment is used, the ping-pong problem can be solved.

Figure 16:
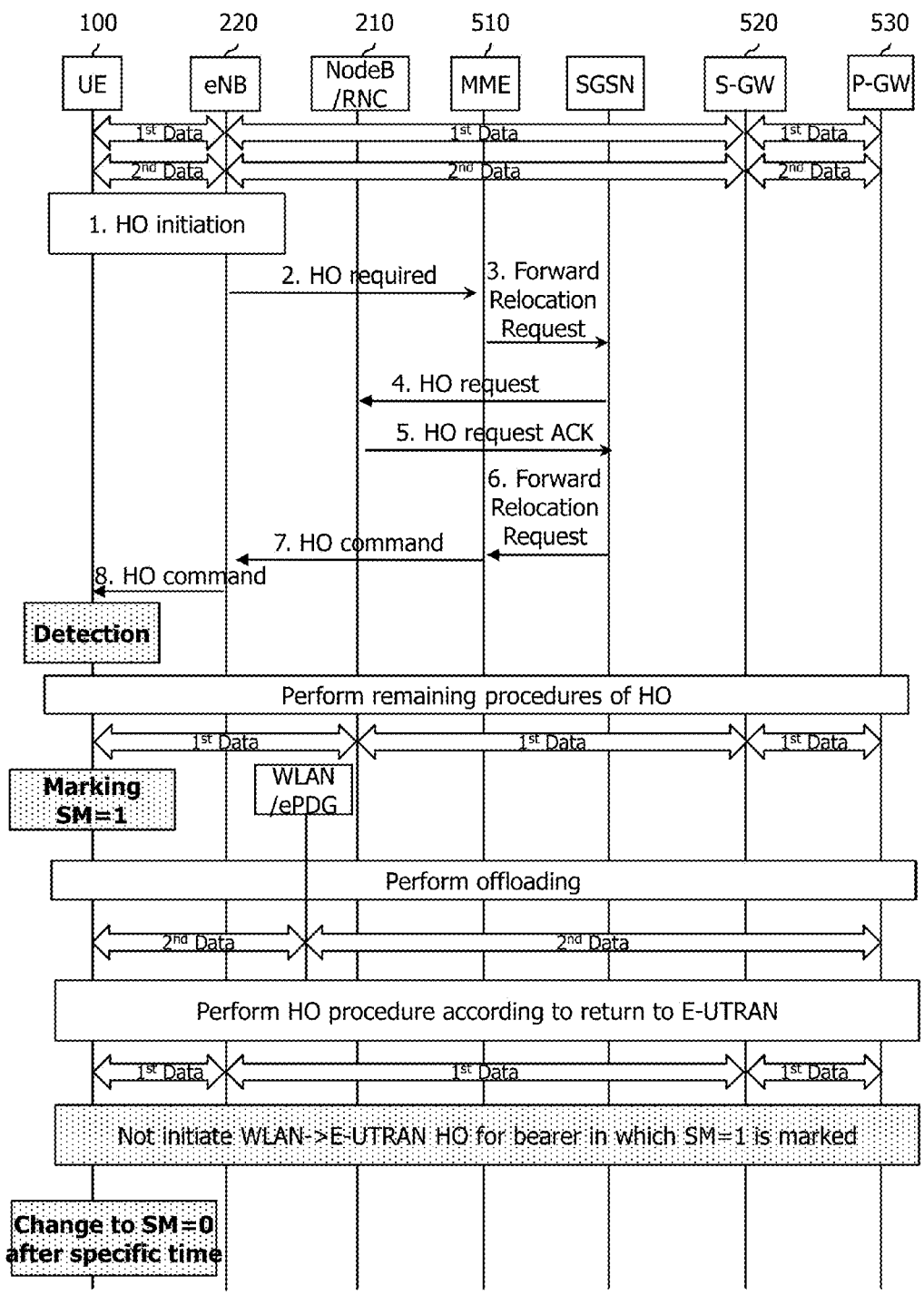
FIG. 16 is a detailed flowchart illustrating the second embodiment conceptually shown in FIG. 14.

FIG. 16 is a detailed flowchart illustrating the second embodiment conceptually shown in FIG. 14.

As can be seen with reference to FIG. 16, the UE 100 performs 1st data traffic and 2nd data traffic via the S-GW 520 and the P-GW 530 of the EPC through the eNodeB 220 of the E-UTRAN and moves to the coverage of the NodeB 210 of the UTRAN.

1~7) In response thereto, handover is initiated, and messages, such as those shown in FIG. 15, are transmitted and received.

8) The eNodeB 220 sends an HO command to the UE 100.

Here, the UE 100 can detect whether or not a bearer for the 2nd data traffic is released based on information within the HO command. Furthermore, if a policy provided by the ANDSF for the 2nd data traffic, for example, an ISRP is set in order of the E-UTRAN>WLAN>UTRAN, the UE 100 determines to offload the 2nd data traffic to the WLAN.

Thereafter, when the remaining procedures of the handover are performed, the 1st data traffic is transmitted and received via the NodeB 210 of the UTRAN.

Furthermore, in accordance with the determination, the 2nd data traffic is marked.

For example, the 2nd data traffic may be marked with 'SM=1'. Thereafter, the 2nd data traffic is offloaded onto the WLAN.

Thereafter, if the UE 100 geographically moves and returns to the area of the E-UTRAN, a handover procedure from the UTRAN to the E-UTRAN is performed.

When the handover is performed, the 1st data traffic is transmitted and received via the eNodeB 220 of the E-UTRAN.

However, since the 2nd data traffic offloaded onto the WLAN has been marked, the UE 100 does not perform a handover procedure for transferring the 2nd data traffic to the E-UTRAN although the E-UTRAN>WLAN>UTRAN set in the policy provided by the ANDSF for the 2nd data traffic, for example, the ISRP is satisfied.

The marking may be released after a lapse of a specific time. For example, after a specific time elapses as shown in FIG. 16, the marking may be released as the 2nd data traffic is marked with 'SM=0'.

Figure 17:
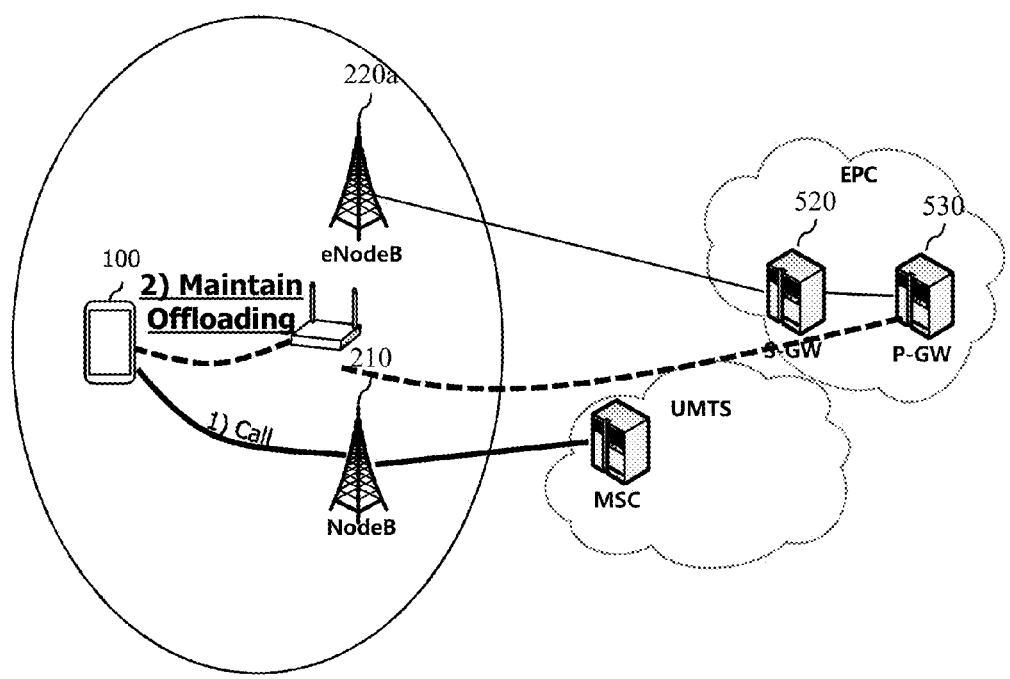
FIG. 17 is a conceptual diagram showing solutions according to a third embodiment and a fourth embodiment for solving a problem that may occur after data traffic is offloaded onto a WLAN due to CSFB.

FIG. 17 is a conceptual diagram showing solutions according to a third embodiment and a fourth embodiment for solving a problem that may occur after data traffic is offloaded onto a WLAN due to CSFB.

If UE placed in an area where an E-UTRAN is possible does not support Voice over LTE (VoLTE), the UE camps on a UTRAN according to a Circuit Switched Fall-Back (CSFB) mechanism in order to receive or send a call. If there is IP data traffic performed by the UE, the IP data traffic may be offloaded onto a WLAN.

If the UE returns to the E-UTRAN after the termination of the call, a timer may used in accordance with the third embodiment of this specification or a marking and trace scheme may be used in accordance with the fourth embodiment of this specification in order to prevent the IP data traffic offloaded onto the WLAN from being transferred to the E-UTRAN.

Figure 18:
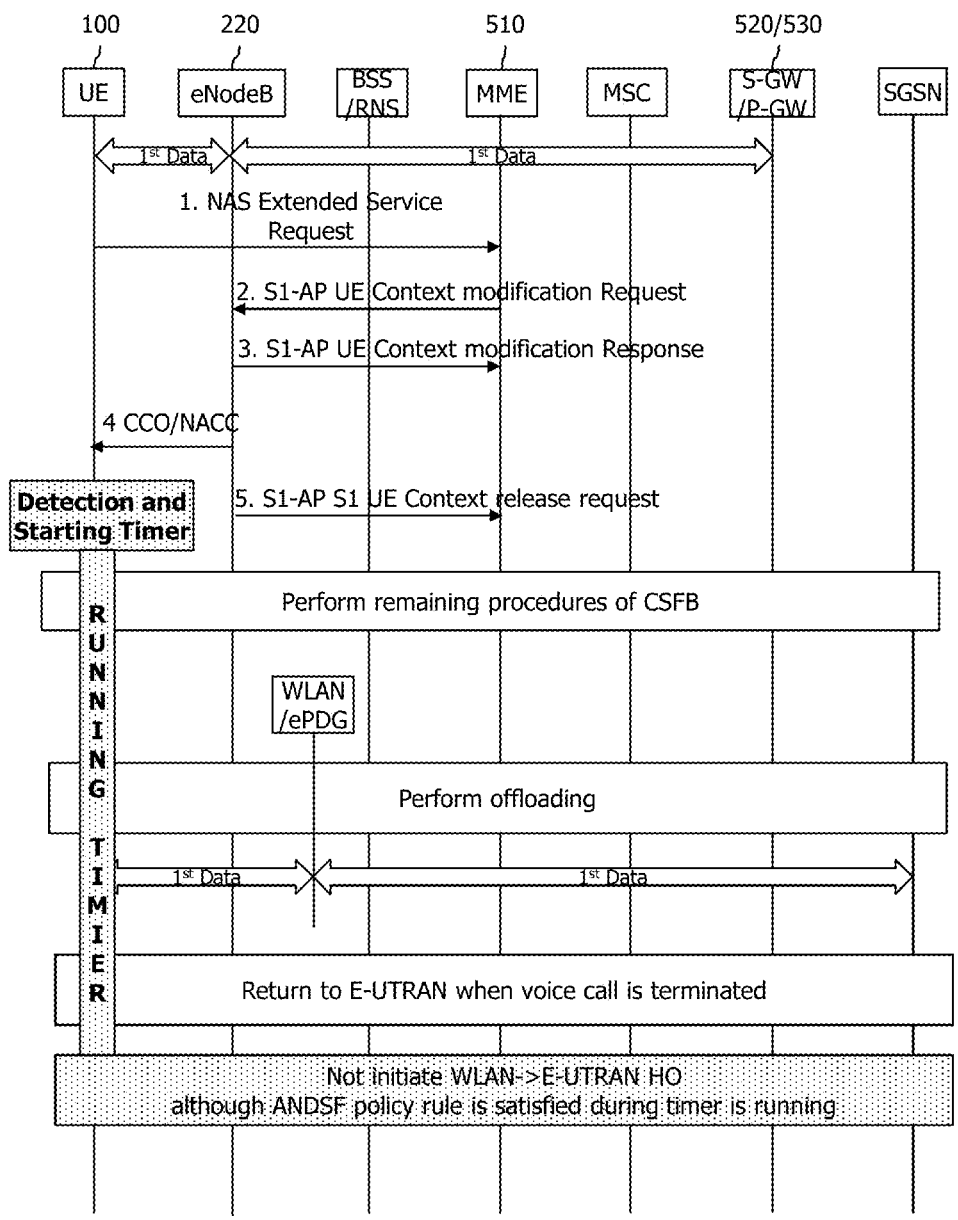
FIG. 18 is a detailed flowchart illustrating the third embodiment conceptually shown in FIG. 17.

FIG. 18 is a detailed flowchart illustrating the third embodiment conceptually shown in FIG. 17.

As can be seen with reference to FIG. 18, the UE 100 progresses 1st data traffic via the S-GW 520 and the P-GW 530 of the EPC through the eNodeB 220 of the E-UTRAN and determines to send a call.

1) Accordingly, the UE 100 sends an extended service request message (e.g., the extended service request message of the NAS layer) to the MME 510.

2~3) In response to the extended service request message, the MME 510 sends a context modification request message (e.g., a UE context modification request message based on an S1-AP) to the eNodeB 220, and the eNodeB 220 sends a context modification response message (e.g., a UE context modification response message based on the S1-AP) to the MME 510.

4~5) In order to notify CSFB, the eNodeB 220 sends a CCO/NACC message to the UE 100. Next, the eNodeB 220 sends a context release request message (e.g., an S1 UE context release request message based on the S1-AP) to the MME 510.

If the 1st data traffic performed in accordance with the CSFB mechanism is no longer progressed and suspended, the UE 100 can detect such suspension. Here, if a policy provided by the ANDSF, for example, an ISRP is set in order of E-UTRAN>WLAN>UTRAN for the affected IP traffic by CSFB, the UE 100 determines to offload the 1st data traffic to the WLAN. Accordingly, the UE 100 runs a timer.

Thereafter, the remaining procedures according to the CSFB mechanism are performed, and thus a voice call is connected.

Furthermore, in accordance with the determination, the data traffic is offloaded onto the WLAN.

Thereafter, after the voice call is terminated, the UE returns to the E-UTRAN.

However, a handover procedure for transferring the 1st data traffic, which has been offloaded onto the WLAN, to the E-UTRAN is not performed although the E-UTRAN>WLAN>UTRAN set in the policy (e.g., the ISRP) provided by the ANDSF for the 1st data traffic is satisfied before the timer expires.

In the third embodiment, a point of time at which the timer is run may be changed as in modification examples below. However, the point of time is not limited as in the following modification examples, but may be changed in various ways.

In a first modification example, UE may receive a message from an eNodeB during a CSFB procedure, recognize that a bearer has been suspended, and runs a timer at a specific point of time. Here, the UE may start offloading onto a WLAN simultaneously with the running of the timer. For example, the specific point of time may be a point of time after it is determined that data traffic through the bearer can be offloaded onto the WLAN. For another example, the specific point of time may be a point of time after it is determined that data traffic through the bearer can be offloaded onto the WLAN since a CSFB procedure is fully completed.

In a second modification example, after a CSFB procedure is terminated, when UE recognizes the occurrence of a suspended bearer, the UE may determine to offload data traffic through the suspended bearer onto a WLAN and run a timer.

In a third modification example, after offloading onto a WLAN is successfully performed, UE may run a timer. If the offloading fails, the UE may not run the timer.

In a fourth modification example, if data traffic offloaded onto a WLAN still remains at a point of time at which a procedure for returning the data traffic from a UTRAN to an E-UTRAN due to the termination of a voice call, UE may run a timer. To be concrete, the UE may start the timer as soon as the voice call is ended or may start the timer at a point of time at which the data traffic is returned to the E-UTRAN because the data traffic may be returned to the E-UTRAN on a specific time in accordance with a CSFB implementation. Here, if the offloaded data traffic is terminated, the timer does not need to be started. The reason why the timer is run at the point of time at which the handover procedure from the UTRAN to the E-UTRAN is started as described above is to prevent the offloaded traffic from being immediately transferred to the E-UTRAN again when the time of the timer is short. That is, this is for making traffic offloaded onto a WLAN stay as long as possible.

Figure 19:
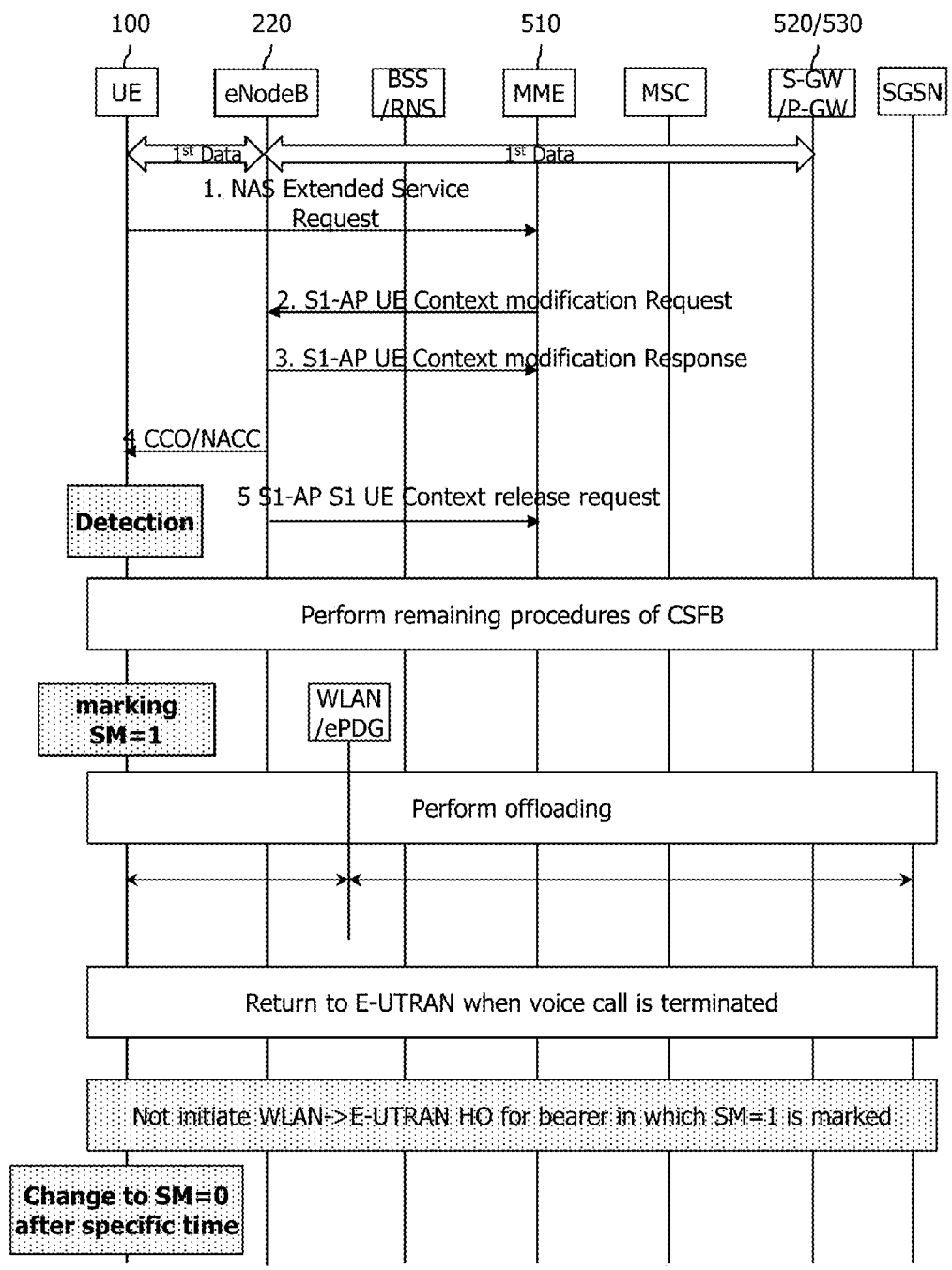
FIG. 19 is a detailed flowchart illustrating the fourth embodiment conceptually shown in FIG. 17.

FIG. 19 is a detailed flowchart illustrating the fourth embodiment conceptually shown in FIG. 17.

As can be seen with reference to FIG. 19, the UE 100 progresses 1st data traffic via the S-GW 520 and the P-GW 530 of the EPC through the eNodeB 220 of the E-UTRAN and determines to send a call.

1~5) As shown in FIG. 18, control signals for CSFB are transmitted and received.

If the 1st data traffic performed in accordance with the CSFB mechanism is no longer progressed and suspended, the UE 100 can detect such suspension. Here, a policy provided by the ANDSF for the 1st data traffic, for example, an ISRP is set in order of E-UTRAN>WLAN>UTRAN, the UE 100 determines to offload the 1st data traffic onto the WLAN.

Thereafter, the remaining procedures according to the CSFB mechanism are performed, and thus a voice call is connected.

Furthermore, in accordance with the determination, the 1st data traffic is offloaded onto the WLAN. Here, the UE performs marking on the 1st data traffic offloaded onto the WLAN.

Thereafter, after the voice call is terminated, the UE 100 returns to the E-UTRAN.

Since the 1st data traffic, which has been offloaded onto the WLAN has been marked, the UE 100 does not perform a handover procedure for transferring the 1st data traffic offloaded onto the WLAN the E-UTRAN although E-UTRAN>WLAN>UTRAN set in the policy (e.g., the ISRP) provided by the ANDSF is satisfied.

The marking may be released after a lapse of a specific time. For example, the marking may be released when the 1st data traffic is marked with 'SM=0' after a specific time elapses as shown in FIG. 19.

The contents described so far may be implemented in hardware. Such an implementation is described with reference to FIG. 20.

Figure 20:
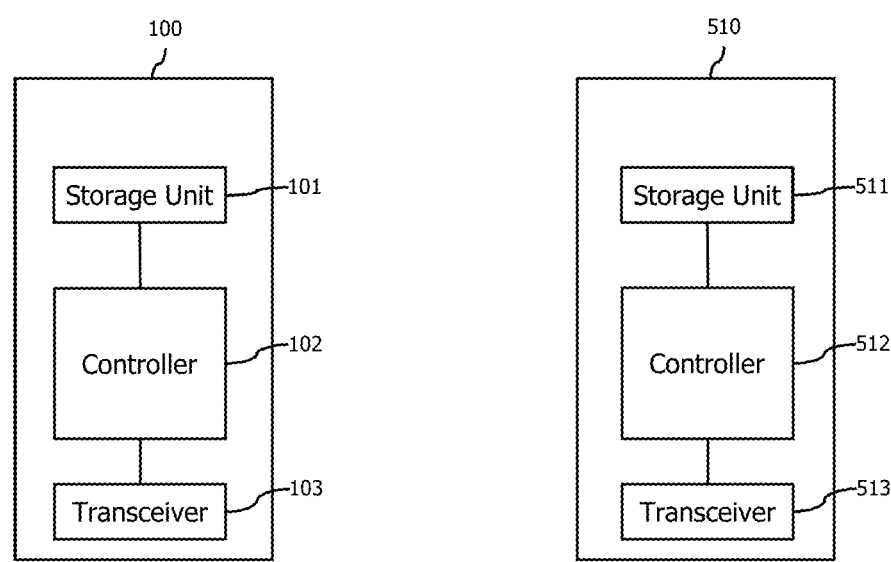
FIG. 20 is a block diagram of UE 100 and an MME 510 in accordance with an embodiment of the present invention.

FIG. 20 is a block diagram of the UE 100 and the MME 510 in accordance with an embodiment of the present invention.

As shown FIG. 20, the UE 100 includes memory means 101, a controller 102, and a transceiver unit 103. Furthermore, the MME 510 includes memory means 511, a controller 512, and a transceiver unit 513.

The memory means (101, 511) stores the methods shown in FIGS. 8 to 19.

The controller (102, 512) controls the memory means (101, 511) and the transceiver unit (103, 513). To be concrete, the controller (102, 512) executes the methods stored in the memory means (101, 511). Furthermore, the controller (102, 512) sends the aforementioned signals through the transceiver unit (103, 513).

Although the preferred embodiments of the present invention have been illustratively described, the scope of the present invention is not limited to only the specific embodiments, and the present invention can be modified, changed, or improved in various forms within the spirit of the present invention and within a category written in the claims.

The invention claimed is:

1. A method for offloading non-voice traffic, the method comprising:
   receiving, at a user equipment (UE) connected to an E-UTRAN, a Circuit Switched (CS) Service Notification from an eNodeB, wherein the UE supports Multi-Access Packet Data Network Connectivity (MAPCON) and Internet Protocol Flow Mobility and Seamless Offload (IFOM), and wherein an Inter System Routing Policy (ISRP) is stored in the UE;
   connecting to a UTRAN as a result of a handover procedure triggered by the CS Service Notification;
   offloading non-voice traffic to a WLAN based on the ISRP;
   connecting to an E-UTRAN as a result of a handover procedure;
   re-routing the non-voice traffic through the E-UTRAN if it is determined that a timer has expired; and
   maintaining the offloading of the non-voice traffic through the WLAN if it is determined that the timer has not expired.

2. The method of claim 1,
   wherein the non-voice traffic is re-routed through the E-UTRAN if it is determined that the timer has expired and it is determined that a marker for the non-voice traffic is removed; and wherein the offloading of the non-voice traffic through the WLAN is maintained if it is determined that the timer has not expired and the marker for the non-voice traffic is not removed.

3. The method of claim 1, wherein the offloading of the non-voice traffic to the WLAN is based on the ISRP and in accordance with Circuit Switched Fall-Back.

4. The method of claim 1 further comprising:
   receiving the ISRP from an Access Network Discovery and Selection Function (ANDSF).

5. The method of claim 1 further comprising:
   selecting an access technology or an access network, or both, for routing non-voice traffic matching specific IP flows identified in the ISRP when the UE is using IFOM.

6. The method of claim 1 further comprising:
   selecting an access technology or an access network, or both, for routing non-voice traffic matching a specific Access Point Name (APN) identified in the ISRP when the UE is using MAPCON.

7. A User Equipment (UE) for offloading non-voice traffic, the UE comprising:
   a transceiver unit that receives a Circuit Switched (CS) Service Notification from an eNodeB while the UE is connected to an E-UTRAN, wherein the UE supports Multi-Access Packet Data Network Connectivity (MAPCON) and Internet Protocol Flow Mobility and Seamless Offload (IFOM), and
   wherein an Inter System Routing Policy (ISRP) is stored in the UE; and a control unit that causes the UE to:
   connect to a UTRAN as a result of a handover procedure triggered by the CS Service Notification;
   offload non-voice traffic to a WLAN based on the ISRP;
   connect to an E-UTRAN as a result of a handover procedure;
   re-rout the non-voice traffic through the E-UTRAN if it is determined that a timer has expired; and
   maintain the offloading of the non-voice traffic through the WLAN if it is determined that the timer has not expired.

8. The UE of claim 7, wherein the control unit further causes the UE to:
   re-rout the non-voice traffic through the E-UTRAN if it is determined that the timer has expired and it is determined that a marker for the non-voice traffic is removed; and maintain the offloading of the non-voice traffic through the WLAN if it is determined that the timer has not expired and the marker for the non-voice traffic is not removed.

9. The UE of claim 7, wherein the control unit further causes the UE to offload the non-voice traffic to the WLAN based on the ISRP and in accordance with Circuit Switched Fall-Back.

10. The UE of claim 9, wherein the ISRP is received from a node that is responsible for an Access Network Discovery and Selection Function (ANDSF).

11. The UE of claim 7, wherein the control unit selects an access technology or an access network, or both, for routing non-voice traffic matching specific IP flows identified in the ISRP when the UE is using IFOM.

12. The method of claim 7, wherein the control unit selects an access technology or an access network, or both, for routing non-voice traffic matching a specific Access Point Name (APN) identified in the ISRP when the UE is using MAPCON.

* * * * *